United States Patent [19]

Toyoda

[11] Patent Number: 5,379,587
[45] Date of Patent: Jan. 10, 1995

[54] APPARATUS FOR JUDGING DETERIORATION OF CATALYST OF INTERNAL COMBUSTION ENGINE

[75] Inventor: Katsuhiko Toyoda, Shizuoka, Japan

[73] Assignee: Suzuki Motor Corporation, Shizuoka, Japan

[21] Appl. No.: 102,090

[22] Filed: Aug. 4, 1993

[30] Foreign Application Priority Data

Aug. 31, 1992 [JP] Japan ................... 4-253605
Aug. 31, 1992 [JP] Japan ................... 4-253606
Aug. 31, 1992 [JP] Japan ................... 4-253607

[51] Int. Cl.⁶ .............................. F01N 3/28
[52] U.S. Cl. ........................ 60/276; 60/277; 60/285
[58] Field of Search ............. 60/276, 277, 285, 274

[56] References Cited

U.S. PATENT DOCUMENTS

| | | |
|---|---|---|
| 4,693,076 | 9/1987 | Chujo et al. |
| 4,707,984 | 11/1987 | Katsuno et al. |
| 4,720,973 | 1/1988 | Katsuno. |
| 4,854,124 | 8/1989 | Tamura. |
| 4,977,881 | 12/1990 | Abe et al. |
| 5,119,628 | 6/1992 | Uema .................. 60/277 |
| 5,154,054 | 10/1992 | Nakane et al. |
| 5,154,055 | 10/1992 | Nakane et al. |
| 5,157,921 | 10/1992 | Ito et al. |
| 5,168,700 | 12/1992 | Furuya ............... 60/274 |
| 5,193,339 | 3/1993 | Furuya. |
| 5,280,707 | 1/1994 | Nakashima et al. |

FOREIGN PATENT DOCUMENTS

| | | |
|---|---|---|
| 0478133A2 | 1/1992 | European Pat. Off. |
| 3-253714 | 11/1991 | Japan. |
| 4-008854 | 1/1992 | Japan. |
| 4-109045 | 4/1992 | Japan. |
| 4-116239 | 4/1992 | Japan. |

*Primary Examiner*—Douglas Hart
*Attorney, Agent, or Firm*—Flynn, Thiel, Boutell & Tanis

[57] ABSTRACT

A catalyst deterioration judging apparatus for an internal combustion engine wherein first and second exhaust sensors are provided on the exhaust passage respectively upstream and downstream of a catalyst material provided in the exhaust passage. A control arrangement determines deterioration of the catalyst by sensing the exhaust gas upstream and downstream of the catalyst, and provides a feedback control for controlling the air-fuel ratio.

4 Claims, 26 Drawing Sheets

Front O2 sensor output

Rear O2 sensor output

Correction value of feedback control (F/B)

APPARATUS FOR JUDGING DETERIORATION OF CATALYST OF INTERNAL COMBUSTION ENGINE

FIELD OF THE INVENTION

The present invention relates to a catalyst deterioration judging apparatus of an internal combustion engine.

BACKGROUND OF THE INVENTION

In an internal combustion engine of a vehicle, there is an internal combustion engine having an air-fuel ratio control unit of the fuel jet type as a countermeasure to the problems of harmful exhaust components, fuel consumption ratio, and the like. The air-fuel ratio control unit adjusts an injection amount as an amount of fuel which is supplied to the internal combustion engine by signals from various kinds of sensors such as a throttle opening degree sensor to detect an operating state of the internal combustion engine, an engine rotational speed sensor, and the like, thereby controlling the air-fuel ratio.

In the above air-fuel ratio control unit, a front $O_2$ sensor serving as a first exhaust sensor is provided on the exhaust passage upstream of a catalyst material, a rear $O_2$ sensor serving as a second exhaust sensor is provided on the exhaust passage downstream of the catalyst material, the front and rear $O_2$ sensors are connected to control means, and the control means performs a dual $O_2$ feedback control in a manner such that the air-fuel ratio is first feedback controlled to a value in a stationary operating range of the internal combustion engine by a first detection signal from the front $O_2$ sensor, the air-fuel ratio is open controlled in case of an acceleration/deceleration operating state other than the stationary operating range of the internal combustion engine, and when the second feedback control performing conditions are satisfied, the air-fuel ratio is second feedback controlled by a second detection signal from the rear $O_2$ sensor, and the air-fuel ratio is open controlled in cases other than the second feedback control performing conditions.

In the internal combustion engine having the above air-fuel ratio control unit, there is also a catalyst deterioration judging apparatus for judging and diagnosing a deterioration of the catalyst material.

As a catalyst deterioration judging apparatus of the internal combustion engine, there is an apparatus disclosed in JP-A-4-109045. The air-fuel ratio control method and apparatus disclosed in this publication comprises: purifying means provided in an exhaust pipe of the internal combustion engine; air-fuel ratio detecting means arranged on each of the upstream side and the downstream side of the purifying means; fuel supplying means for supplying a fuel to cylinders of the internal combustion engine; and electronic control means for receiving detection signals from the air-fuel ratio detecting means and for controlling the fuel supplying means, wherein an air-fuel ratio of mixture gases which are supplied to the cylinders of the internal combustion engine is controlled on the basis of a detection signal of the air-fuel ratio detecting means on the upstream side, and the control means monitors a deterioration of the purifying means in accordance with a response change of the detection signal of the air-fuel ratio detecting means on the downstream side when a target value of the air-fuel ratio is changed, thereby enabling the presence or absence of the deterioration of the catalyst to be judged in a relatively short time and at a high reliability.

There is also an apparatus disclosed in JP-A-4-116239. According to a catalyst deterioration diagnosing apparatus of an internal combustion engine disclosed in the latter publication, when a deterioration of the catalyst is judged by comparing an output of an air-fuel ratio sensor on the upstream side of a catalytic converter and an output of an air-fuel ratio sensor on the downstream side, in the case where the updating of the learning correction using the downstream side sensor is not sufficiently executed, its diagnosis is inhibited, thereby preventing a decrease in diagnosing precision due to an actual deviation of the air-fuel ratio itself or a variation of a judgment reference.

A conventional catalyst deterioration judging apparatus of an internal combustion engine judges a deterioration state of a catalyst material in a catalytic converter. However, there is not known a catalyst deterioration judging apparatus which functions to judge deterioration states of two exhaust sensors which sandwich the catalyst material therebetween, and particularly the deterioration state of the front $O_2$ sensor.

Although there is no inconvenience in the ordinary use state of a vehicle, for example, in case of using leaded gasoline, the engine is subjected to the poison property of lead in leaded gasoline. There are inconveniences in that the function of the catalyst material in the catalytic converter and the function of the front $O_2$ sensor remarkably deteriorate, the exhaust gas purifying function of the catalyst material in the catalytic converter deteriorates, and the controllability of the air-fuel ratio of the front $O_2$ sensor deteriorates.

Further, in the case where a high tension cord is pulled out and an accidental fire occurs due to an unexpected accident, the catalyst material in the catalytic converter or the front $O_2$ sensor is damaged. In a manner similar to the case of using leaded gasoline as mentioned above, there are inconveniences in that the function of the catalyst material in the catalytic converter or the function of the front $O_2$ sensor remarkably deteriorates, the exhaust gas purifying function of the catalyst material in the catalytic converter deteriorates, and the controllability of the air-fuel ratio of the front $O_2$ sensor deteriorates.

To eliminate the above inconveniences, according to a first embodiment of the present invention, there is provided a catalyst deterioration judging apparatus of an internal combustion engine in which a first exhaust sensor is provided on an exhaust passage of the internal combustion engine on the upstream side of a catalyst material, a second exhaust sensor is provided on the exhaust passage on the catalyst downstream side, and a deterioration of the catalyst material is judged while feedback controlling an air fuel ratio by detection signals of the first and second exhaust sensors, characterized by control means having judging function which is constructed in a manner such that upon judgment of a deterioration, a feedback correction amount is set to be larger than that in the ordinary state, a dual exhaust sensor feedback control is stopped, a rich judgment delay time and a lean judgment delay time are set in accordance with a ratio at the time of an ordinary dual exhaust sensor feedback control so as to set a rich/lean judgment delay time to a predetermined time, the feedback correction amount is set to a deterioration judgment value, a second exhaust sensor response delay time is corrected by an engine load and an exhaust temperature, and the value is corrected by a period of a first exhaust sensor period of time, the second exhaust sensor response time after completion of the correction is compared with said deterioration. judgment value, and the deterioration of the catalyst material is judged.

There is also provided a catalyst deterioration judging apparatus of an internal combustion engine in which a first exhaust sensor is provided on an exhaust passage of the internal combustion engine on the upstream side of a catalyst material, a second exhaust sensor is provided on the exhaust passage on the catalyst downstream side, and a deterioration of the catalyst material is judged while feedback controlling an air fuel ratio by detection signals of the first and second exhaust sensors, characterized by control means having a function which is constructed in a manner such that a rich judgment delay time and a lean judgment delay time are set in accordance with a ratio at the time of an ordinary dual exhaust sensor feedback control, and when a rich-/lean judgment delay time is set to a predetermined time, variation characteristics of an output performance of the first exhaust sensor are measured by the first exhaust sensor period of time, and the deterioration judgment value is corrected by the variation characteristics.

According to the invention as mentioned above, when the deterioration is judged by the control means, the feedback correction amount is set to be larger than that in the ordinary state, the dual exhaust sensor feedback control is stopped, the rich judgment delay time and the lean judgment delay time are set in accordance with the ratio at the time of the ordinary dual exhaust sensor feedback control so that the rich/lean judgment delay time is set to a predetermined time, the feedback correction amount is set to the deterioration judgment value, the second exhaust sensor response delay time is corrected by the engine load and the exhaust temperature, the above value is corrected by the period of the first exhaust sensor period time, the second exhaust sensor response delay time after completion of the correction is compared with the deterioration judgment value, and the deterioration of the catalyst material is judged. On the other hand, the rich judgment delay time and the lean judgment delay time are set in accordance with the ratio at the time of the ordinary dual exhaust sensor feedback control, and when the rich-/lean judgment delay time is set to a predetermined value, the variation characteristics of the output performance of the first exhaust sensor are measured by the first exhaust sensor period time, and the deterioration judgment value is corrected in accordance with the variation characteristics by the control means.

The present invention also provides an apparatus for judging a deterioration of a catalyst of an internal combustion engine in which a first exhaust sensor is provided on an exhaust passage of the internal combustion engine on the upstream side of a catalyst material, a second exhaust sensor is provided on the exhaust passage on the downstream side of the catalyst material, a first feedback control is performed to set an air-fuel ratio to a target value on the basis of a first feedback control value which is calculated from a first detection signal that is generated from said first exhaust sensor, and a second feedback control is executed to correct the first feedback control value by judging a deterioration state of the catalyst material on the basis of a second detection signal that is generated from the second exhaust sensor, characterized by a control means for controlling in a manner such that when catalyst deterioration judging conditions are satisfied, the second feedback control value upon judgment of the deterioration is set in correspondence to the second feedback control value in the case where the catalyst deterioration judging conditions are not satisfied, the sum of a rich inversion delay time and a lean inversion delay time is set to a predetermined value, a ratio of the rich inversion delay time and a ratio of the lean inversion delay time are set to be equal, a correction amount of the first feedback control value is set to be larger than a correction amount in the case where the catalyst deterioration judging conditions are not satisfied, and an integration judging time of the second feedback control value in the case where the catalyst deterioration judging conditions are satisfied is set to be shorter than an integration judging time in the case where the catalyst deterioration judging conditions are not satisfied.

Also according to a construction of the present invention, the control means controls in a manner such that when the catalyst deterioration judging conditions are satisfied, the second feedback control value upon judgment of the deterioration is set in correspondence to the second feedback control value in the case where the catalyst deterioration judging conditions are not satisfied, the sum of the rich inversion delay time and the lean inversion delay time is set to a predetermined value, the ratio of the rich inversion delay time and the ratio of the lean inversion delay time are set to the same value, the correction amount of the first feedback control value is set to be larger than that in the case where the catalyst deterioration judging conditions are not satisfied, and the integration judging time of the second feedback control value in the case where the catalyst deterioration conditions are satisfied is set to be shorter than that in the case where the catalyst deterioration conditions are not satisfied. Due to this, the deterioration judging precisions of the catalyst material and the exhaust sensors are improved. A measurement variation amount of the deterioration judgment is reduced in the case where the catalyst deterioration judging conditions are satisfied is reduced. An amount of exhaust harmful components which are generated upon switching between the second feedback control values when the catalyst deterioration judging conditions are not satisfied and when the catalyst deterioration judging conditions are satisfied can be reduced. Moreover, the variation of the response delay time can be also decreased.

According to a third embodiment of the present invention, there is provided an apparatus for judging deterioration of a catalyst material of an internal combustion engine comprising: first and second exhaust sensors which are respectively provided on an exhaust passage of the internal combustion engine on the upstream side and downstream side of the catalyst; and control means for performing a first feedback control to set an air fuel ratio to a target value on the basis of a first detection signal which is generated from the first exhaust sensor and for performing a second feedback control to correct the first feedback control by a second detection signal which is generated from the second exhaust sensor, characterized in that the control means has a judging section such that in the case where predetermined deterioration judgment performing conditions are satisfied, the number of first detection signal periods and the number of second detection signal periods in a predetermined arithmetic operating time are measured from periods of time during which the first and second detection signals are inverted, thereby calculating a period ratio, a first detection signal surrounding area and a second detection signal surrounding area in the predetermined arithmetic operating time are measured from areas which are surrounded by loci of the periods of time during which the first and second detection signals are inverted, thereby calculating an area ratio, an operation state value in the predetermined arithmetic operating time is measured from an operating state of the internal combustion engine, thereby calculating a correction value, deterioration judgment arithmetic operation values in which the period ratio and the area ratio have been corrected by the correction value are obtained, and an arithmetic operation is performed so as to judge a deterioration state of the catalyst material by the deterioration judgment arithmetic operation values.

According to the construction of the third embodiment of the invention, in the case where the predetermined deterioration judgment performing conditions are satisfied, the deterioration judgment arithmetic operation values in which the period ratio and the area ratio of the first and second detection signals have been corrected by the correction value are obtained by the judging section provided for the control means, and the deterioration state of the catalyst is calculated by the deterioration judgment arithmetic operation values. As mentioned above, not only the period ratio of the first and second detection signals but also the area ratio are calculated and multiplied and the deterioration judgment arithmetic operation values corrected by the correction value are obtained and the judgment is performed. Thus, the deterioration state of the catalyst can be correctly measured and the judging precision of the deterioration state can be improved.

BRIEF DESCRIPTION OF DRAWINGS

FIGS. 1–17 relate to a first embodiment of the invention wherein:

FIG. 1 diagrammatically illustrates a catalyst deterioration judging apparatus of an internal combustion engine according to the first embodiment;

FIG. 2 is a flowchart of a catalyst deterioration judging apparatus according to this first embodiment;

FIG. 3 is a schematic constructional diagram of a main section of the catalyst deterioration judging apparatus;

FIG. 6 is a diagram showing a catalyst deterioration judging region comprising an engine load and an engine rotational speed.

FIG. 7 is a diagram showing the relationships among the dual $O_2$ feedback control correction amount SOXFB or dual $O_2$ feedback control correction amount mean value SOXFLAV, the rich judgment delay time $D_{LR}$, and the lean judgment delay time $D_{RL}$;

FIG. 9 is a diagram showing a change in deterioration judgment value in the relation between the catalyst purification ratio and the response delay time TDLY of the rear $O_2$ sensor for judgment of the catalyst deterioration;

FIG. 10 is a diagram showing the relation between the response delay time TDLY of the rear $O_2$ sensor for judgment of the catalyst deterioration and the engine load;

FIG. 11 is a diagram showing the relation between the response delay time TDLY of the rear $O_2$ sensor for judgment of the catalyst deterioration and the exhaust temperature;

FIG. 12 is a diagram showing the relation between the front $O_2$ period of time $T_{FR}$ and the engine load;

FIG. 13 is a diagram showing the relation between the coefficient KTDLY and the front $O_2$ period of time $T_{FR}$;

FIG. 14 is a diagram showing the relation between FTDLY which is calculated by the sum of the response delay time TDLY of the rear $O_2$ sensor for judgment of the catalyst deterioration and the coefficient KTDLY and the catalyst purification ratio;

FIG. 15 is a diagram showing the relation between the response delay time TDLY of the rear $O_2$ sensor for judgment of the catalyst deterioration and the front $O_2$ period of time $T_{FR}$;

FIG. 16 is a diagram showing the relation between the variation $\Delta$TDLY on the measurement and $\Delta T_{FR}$; and FIG. 17 is a diagram showing the relation between the variation $\Delta$TDLY on the measurement and the front $O_2$ feedback correction amount.

FIGS. 18–40 relate to a second embodiment of the invention wherein:

FIG. 18 is a schematic constructional diagram of a catalyst deterioration judging apparatus according to the second embodiment;

FIG. 19 is a flowchart for explaining the operation for judging catalyst deterioration;

FIG. 20 is a flowchart for explaining the operation for judging catalyst deterioration and is a continuation of the chart of FIG. 19;

FIG. 21 is a constructional diagram of a main section of the catalyst deterioration judging apparatus;

FIG. 22 is an explanatory diagram of a correction amount of the feedback control;

FIG. 23 is an explanatory diagram of periods of detection signals from $O_2$ sensors;

FIG. 24 is a diagram for explaining a detection signal state from a front $O_2$ sensor;

FIG. 25 is a diagram for explaining a response delay time of a rear $O_2$ sensor;

FIG. 26 is a relational diagram between a catalyst purification factor and a response delay time;

FIG. 27 is an explanatory diagram of catalyst deterioration conditions which are satisfied;

FIG. 28 is a relational diagram between the period time of a first detection signal from the front $O_2$ sensor and the response delay/time coefficient;

FIG. 29 is a relational diagram between the engine load and the response delay time;

FIG. 30 is a relational diagram between the exhaust temperature and the response delay time;

FIG. 31 is a relational diagram between the engine load and the period time of the signal from the front $O_2$ sensor;

FIG. 32 is a relational diagram between the catalyst purification factor and the response delay time;

FIG. 33 is a relational diagram between the rear feedback control value in the ordinary state and the rich/lean inversion delay times;

FIG. 34 is a relational diagram between the rear feedback control value upon deterioration judgment and the rich/lean inversion delay times;

FIG. 35 is a relational diagram between the rear feedback control value in the ordinary state and the rear feedback control value upon deterioration judgment;

FIG. 36 is a time chart for correction by the second detection signal from the rear $O_2$ sensor;

FIG. 37 is an explanatory diagram of the period of the first detection signal from the front $O_2$ sensor;

FIG. 38 is a relational diagram between the change in period and the measurement variation;

FIG. 39 is a relational diagram between the correction amount of the first feedback control value and the measurement variation of the response delay time; and FIG. 40 is a relational diagram between the period of the first detection signal of the front $O_2$ sensor and the exhaust amount.

FIGS. 41–53 relate to a third embodiment of the invention wherein:

FIG. 41 is a constructional diagram of a catalyst deterioration judging apparatus of an internal combustion engine showing the third embodiment of the invention;

FIG. 42 is a flowchart for judgment of the catalyst deterioration judging apparatus;

FIG. 43 is a block diagram of the catalyst deterioration judging apparatus;

FIG. 44 shows an output waveform diagram of the first $O_2$ sensor;

FIG. 45 shows an output waveform diagram at the time of high purification of the second $O_2$ sensor;

FIG. 46 shows an output waveform diagram at the time of low purification of the second $O_2$ sensor;

FIG. 47 shows an output waveform diagram of the second $O_2$ sensor when a rich-lean judgment voltage is small;

FIG. 48 shows an output waveform diagram of the second $O_2$ sensor when the rich-lean judgment voltage is large;

FIG. 49 is an explanatory diagram for judgment of a catalyst deterioration in the case of only a period ratio and an area ratio;

FIG. 50 is an explanatory diagram for judgment of a catalyst deterioration in the case where a period ratio and an area ratio have been corrected by a correction value;

FIG. 51 is an explanatory diagram of a catalyst deterioration judgment area;

FIG. 52 is an explanatory diagram for correction by an exhaust temperature; and

FIG. 53 is an explanatory diagram for correction by an engine load.

DETAILED DESCRIPTION

FIGS. 1–17

FIGS. 1 to 17 show a first embodiment of the present invention.

Figure 1:
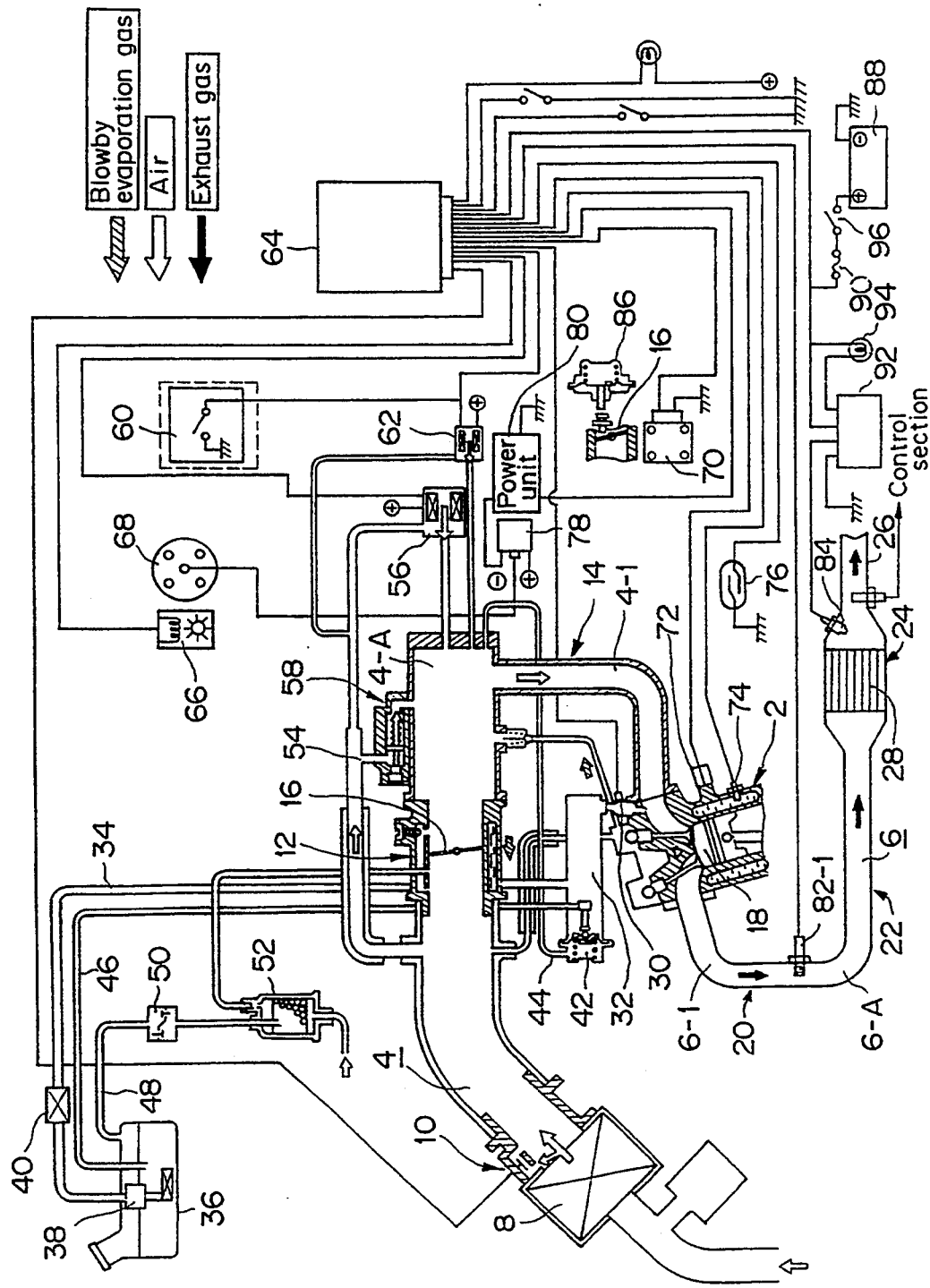

In FIG. 1, reference numeral 2 denotes an internal combustion engine; 4 an intake passage; and 6 an exhaust passage.

The intake passage 4 includes an air cleaner 8, an air flow meter 10, a throttle body 12, and an intake manifold 14 which are sequentially connected from the upstream side. The intake passage 4 in the throttle body 12 has an intake throttle valve 16. The intake passage 4 in the intake manifold 14 is constructed by: a surge tank portion 4-A serving as an intake collecting section; and first to fourth parallel branch intake passage portions (only a single branch passage 4-1 being shown in FIG. 1) which are branched from the surge tank portion 4-A. The first to fourth branch intake passages are respectively communicated with first to fourth cylinders (only a single cylinder 18 being shown in FIG. 1).

The exhaust passage 6 is formed by an exhaust manifold 20, an upstream side exhaust pipe 22, a catalytic converter 24, and a downstream side exhaust pipe 26 which are sequentially connected from the upstream side. The exhaust passage 6 in the exhaust manifold 20 is constructed by: first to fourth parallel branch exhaust passages (such as passage 6-1) which are respectively communicated with the first to fourth cylinders (such as cylinder 18), and an exhaust collecting portion 6-A to which the first to fourth branch exhaust passages are collected. The catalytic converter 24 includes a catalyst material 28.

A fuel injection valve 3C connects to each cylinder 18, and communicates with a fuel tank 36 by a fuel supply passage 34 through a fuel distributing passage 32. The fuel is fed by a fuel pump 38 through a fuel filter 40. The passage 32 distributes and supplies the fuel to the first to fourth fuel injection valves 30.

A fuel pressure adjusting section 42 adjusts the pressure of fuel is provided by the fuel distributing passage 32. The fuel pressure adjusting section 42 adjusts the fuel pressure to a predetermined value by an intake pressure which is led from a connecting passage 44 which communicates with the intake passage 4. The remaining surplus fuel is returned to the fuel tank 36 by a fuel return passage 46.

Further, the fuel tank 36 is communicated with the intake passage 4 of the throttle body 12 by a passage 48 for evaporated fuel. A two-way valve 50 and a canister 52 are sequentially interposed in the passage 48. A bypass passage 54 communicates with the intake passage 4 and bypasses the intake throttle valve 16. An idle air amount control valve 56 is provided in the bypass passage 54 for controlling flow therethrough. When it is necessary to adjust idle rotational speed at start up of the engine, at high temperature, and due to an increase in electrical load and the like, the idle air amount control valve 56 opens or closes the bypass passage 54, thereby increasing or decreasing the air amount and stabilizing the idle rotational speed. Reference numeral 58 denotes an air regulator; 60 a power steering switch; and 62 an air amount control valve for power steering.

The air flow meter 10, first to fourth fuel injection valves 30, idle air amount control valve 56, and air amount control valve 62 for power steering are connected to a control section 64 serving as a control means. A crank angle sensor 66, a distributor 68, an opening degree sensor 70 of the intake throttle valve 16, a knock sensor 72, a water temperature sensor 74, and a vehicle velocity sensor 76 are connected to the control section 64, respectively. The distributor 68 is connected to the control section 64 through an ignition coil 78 and a power unit 80 for ignition.

In FIG. 1, reference numeral 86 denotes a dash pot; 88 a battery; 90 a thermo fuse; 92 an alarm relay; 94 a warning lamp; and 96 a main switch.

Figure 3:
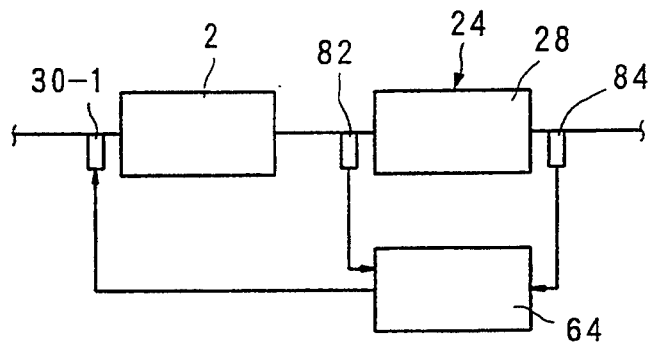

As shown in FIG. 3, a front $O_2$ sensor 82 serving as a first exhaust sensor to detect oxygen concentration as an exhaust component value is provided on the upstream side of the catalytic converter 24 and a rear $O_2$ sensor 84 provided on the downstream side of the catalytic converter 24 are connected to the control section 64. The control section 64 executes what is called a dual $O_2$ feedback control in a manner such that fuel supply amounts to the first to fourth fuel injection valves 30 of the internal combustion engine 2 are controlled. The air-fuel ratio is first feedback controlled to a value in a stationary operating range of the internal combustion engine 2 by a first detection signal from the front $O_2$ sensor 82, the air-fuel ratio is open controlled in case of an accelerating/decelerating operation other than the stationary operating range of the internal combustion engine 2, and when the second feedback control performing conditions are satisfied, the air-fuel ratio is second feedback controlled by a second detection signal from the rear $O_2$ sensor 84, and in cases other than the second feedback control performing conditions, the air-fuel ratio is open controlled.

The control section 64 has a judging function which is constructed in a manner such that when the deterioration is judged, a feedback correction amount is set to be larger than that in the ordinary state, the dual $O_2$ sensor feedback control serving as a dual exhaust sensor feedback control is stopped, a rich judgment delay time and a lean judgment delay time are set in accordance with the ratio at the time of the ordinary dual $O_2$ sensor feedback control so as to set a rich/lean judgment delay time to a predetermined value, the feedback correction amount is set to a deterioration judgment value, the rear $O_2$ sensor 84 response delay time as a second exhaust sensor response delay time is corrected by engine load and exhaust temperature, this value is corrected by the period of time of the front $O_2$ sensor 82 serving as a first exhaust sensor, the rear $O_2$ sensor 84 response delay time after completion of the correction is compared with the deterioration judgment value, and a deterioration of the catalyst material 28 in the catalytic converter 24.

Figure 4A:
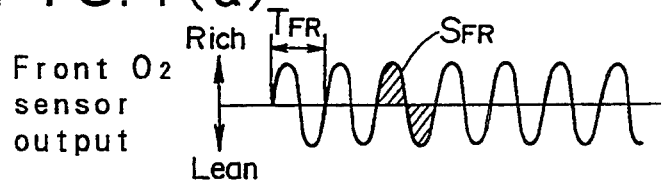
FIG. 4(a) is a diagram showing front $O_2$ sensor output.
Figure 4B:
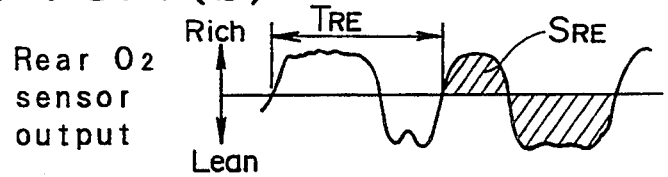
FIG. 4(b) is a diagram showing rear $O_2$ sensor output in case of a high purification ratio.
Figure 4C:
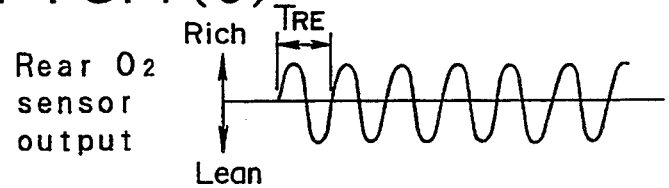
FIG. 4(c) is a diagram showing the rear $O_2$ sensor output in case of a low purification ratio.
Figure 5A:
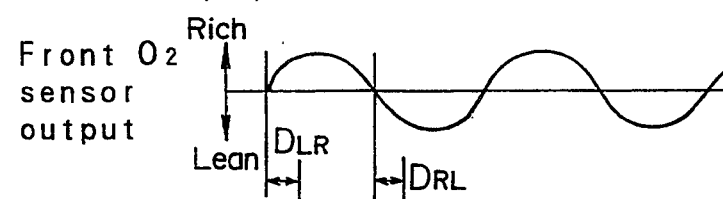
FIG. 5(a) is a diagram showing front $O_2$ sensor output.
Figure 5B:
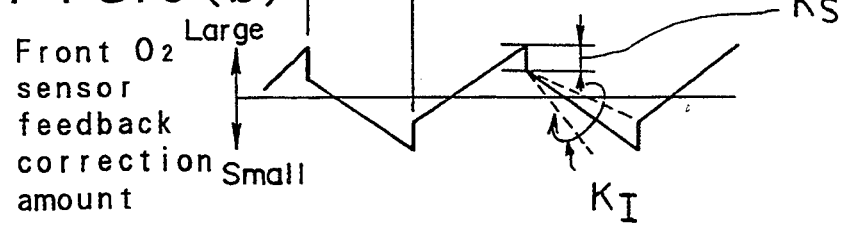
FIG. 5(b) is a diagram showing front $O_2$ sensor feedback correction amount.

Explaining in detail, as shown in FIG. 4, the embodiment judges a deterioration state in an imitation manner by a period ratio of the period due to the response delay time and an area ratio between the front $O_2$ sensor 82 and the rear $O_2$ sensor 84. As shown in FIGS. 4(a), 4(b), and 4(c), an output of the rear $O_2$ sensor 84 changes due to a catalyst purification ratio upstream. To reduce variation of a response delay time TDLY of the rear $O_2$ sensor for judgment of a deterioration of the catalyst, as shown in FIG. 5(b), the front $O_2$ sensor feedback correction amount needs to be set to be larger than that in the ordinary one.

The control section 64 starts the deterioration judging operation only when predetermined deterioration judging conditions of the catalyst material 28 in the catalytic converter 24 are satisfied.

The predetermined deterioration judging conditions of the catalyst material 28 in the catalytic converter 24 are as follows:
1. During execution of the main $O_2$ feedback
2. During execution of the dual $O_2$ feedback
3. Within region of FIG. 6
4. Completion of engine warming-up
5. Intake air temperature $\geq$ set value
6. Constant velocity (The change amount of each of the air amount, throttle opening degree, injection amount, and the like is equal to or less than a set value).

Further, the control section 64 also has a function such that a rich judgment delay time and a lean judgment delay time are set in accordance with the ratio at the time of the dual $O_2$ sensor feedback control serving as an ordinary dual exhaust sensor, and when the rich/lean judgment delay time is set to a predetermined value, variation characteristics of the output performance of the front $O_2$ sensor 82 are measured by the period of time of the front $O_2$ sensor 82 as a first exhaust sensor, and the deterioration judgment value is corrected by the variation characteristics.

Figure 15:
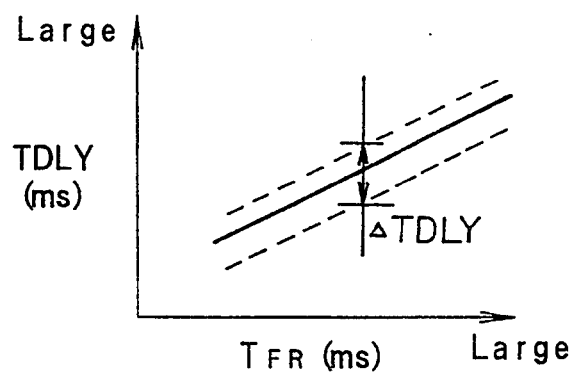
Figure 16:
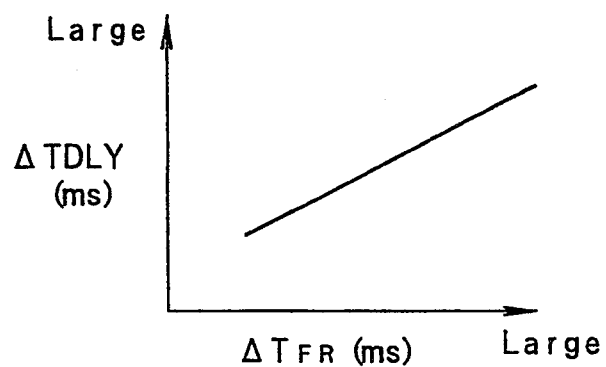
Figure 17:
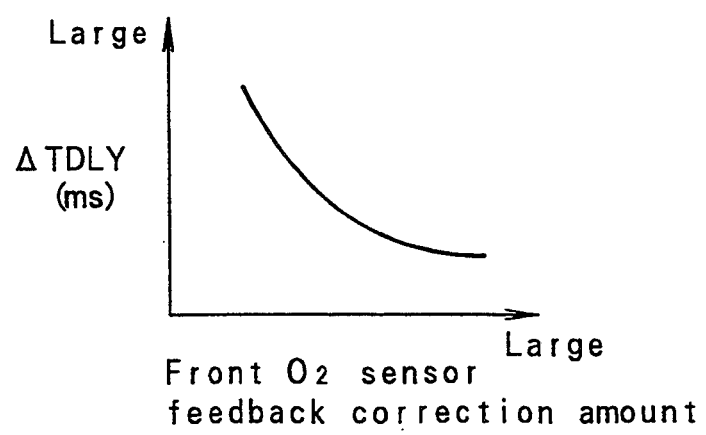

Explaining in detail, in the case where the engine load and the exhaust temperature are set to predetermined values, there is a relation as shown in FIG. 15 between a front $O_2$ period of time $T_{FR}$ and the response delay time TDLY of the rear $O_2$ sensor for judgment of the deterioration of the catalyst. However, actually, since a variation on measurement occurs as shown by a broken line, such a variation $\Delta$TDLY on the measurement is reduced.

The variation $\Delta$TDLY on the measurement similarly increases as the front $O_2$ period of time $T_{FR}$ increases. It is necessary to reduce the variation $\Delta$TDLY on the measurement of the response delay time TDLY of the rear $O_2$ sensor for judgment of the catalyst deterioration.

Upon judgment of the deterioration, to reduce the variation $\Delta$TDLY on the measurement, the following three operations are executed:
1. Dual $O_2$ sensor feedback control is stopped.
2. The sum of a rich judgment delay time $D_{LR}$ and a lean judgment delay time $D_{RL}$ is set to a predetermined value.
3. Feedback correction amount is set to a large value.

By correcting the engine load, exhaust temperature, and variation characteristics of the $O_2$ sensors upon measurement, the response delay time TDLY of the rear $O_2$ sensor for judgment of the catalyst deterioration can be accurately measured.

Figure 2:
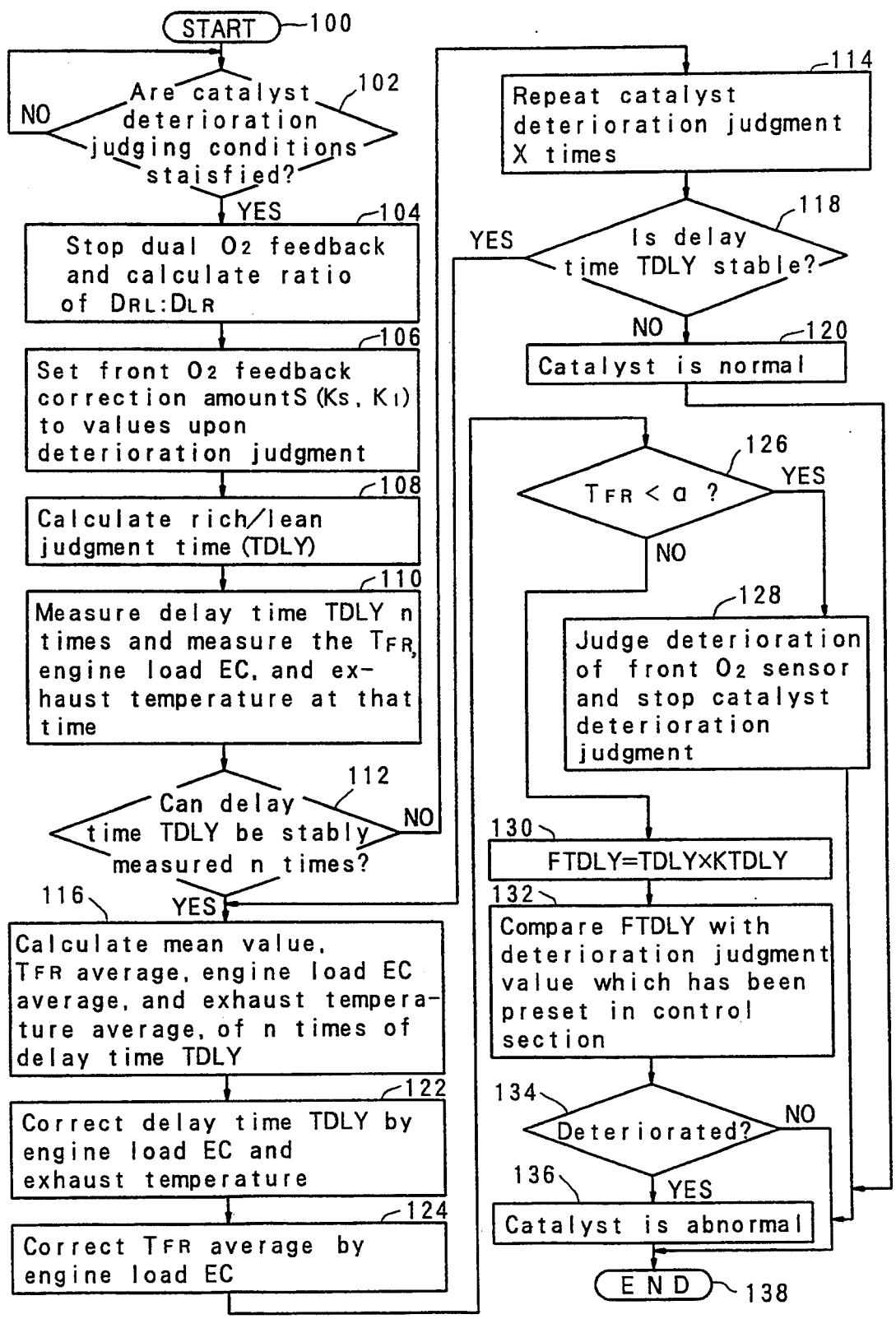

The control by the catalyst deterioration judging apparatus will now be described in accordance with a flowchart of FIG. 2.

By starting the internal combustion engine 2, a program of the flowchart is started at step 100.

Figure 6:
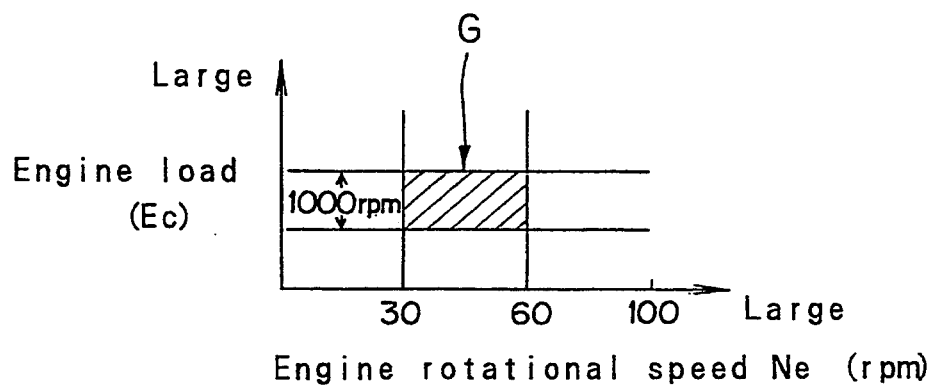
Figure 7:
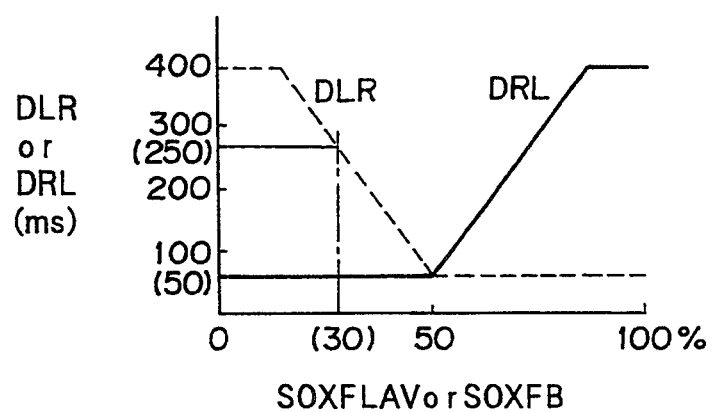
Figure 8A:
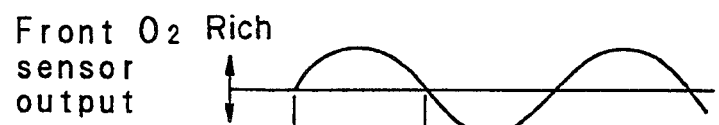
FIG. 8(a) is a diagram showing front $O_2$ sensor output.
Figure 8B:
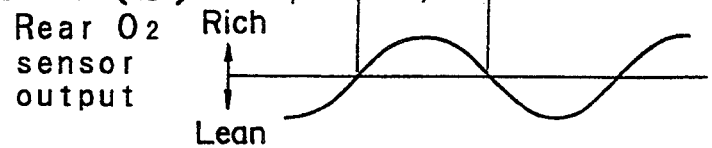
FIG. 8(b) is a diagram showing a rear $O_2$ sensor output.
Figure 9:
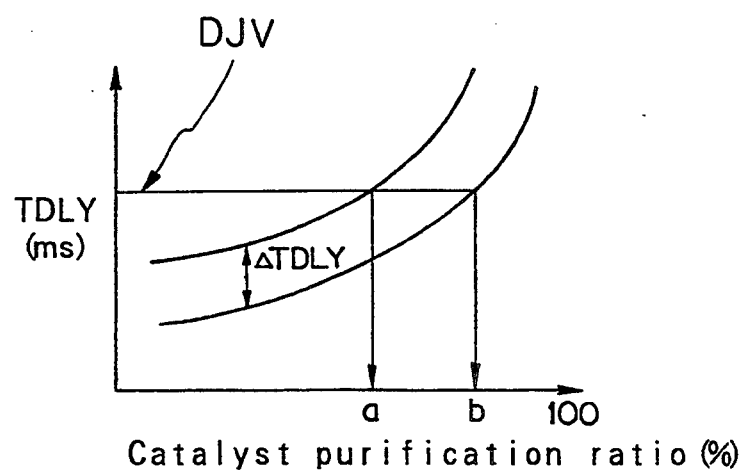
Figure 10:
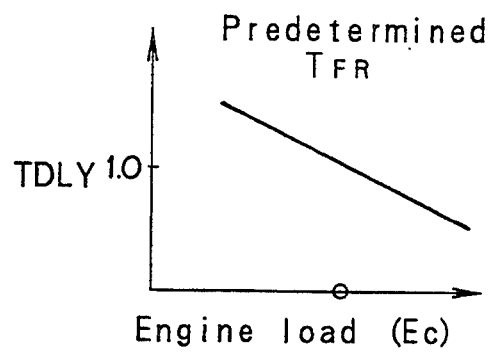

A check is made at step 102 to see if the catalyst deterioration judging conditions as predetermined deterioration judging conditions of the catalyst material 28 in the catalytic converter 24 shown in FIG. 6 are satisfied or not., If NO in step 102, the above processing routine is repeated until the answer in the discriminating step 102 is YES. If YES in step 102, the dual $O_2$ feedback control is stopped and, as shown in FIG. 10, the rich judgment delay time $D_{LR}$ and the lean judgment delay time $D_{RL}$ are calculated at step 104 by the ratio of the ordinary dual $O_2$ sensor feedback control.

At step 106, and as shown in FIG. 5(b), the front $O_2$ feedback correction amount is set to a value upon a deterioration judgment by a skip correction amount ($K_S$) and an integration correction amount (gradient) ($K_I$).

The rich/lean judgment time is calculated (TDLY) at step 108.

The delay time TDLY is measured n times and the front $O_2$ period of time $T_{FR}$, engine load EC, and exhaust temperature in this instance are measured at step 110. At this time, the period of the feedback correction amount can be also measured and used.

A check is made at step 112 to see if the delay time TDLY could stably be measured n times or not.

If NO at step 112, the processing routine advances to step 114 to repeat the catalyst deterioration judgment X times. If YES at step 112, the mean value of n times of the delay time TDLY, $T_{FR}$ average, engine load EC average, and exhaust temperature average are calculated at step 116.

A check is made at step 118 to see if the delay time TDLY is stable or not after the processing step 114 to repeat the catalyst deterioration judgment X times. If NO at step 118, it is determined that the catalytic converter 24 is normal at step 120. The processing routine advances to end step 128 of the program. If YES at step 118, the processing routine advances to step 116 to calculate the mean value of n times of the delay time TDLY, $T_{FR}$ average, engine load EC average, and exhaust temperature average.

Figure 11:
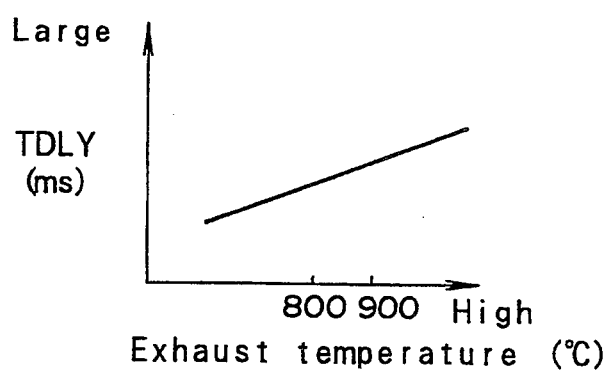
Figure 12:
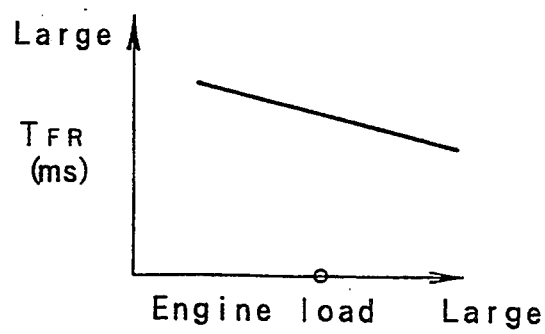

After completion of the processing step 116 to calculate the average value of n times of the delay time TDLY, $T_{FR}$ average value, engine load EC average value, and exhaust temperature average value, as shown in FIGS. 10 and 11, the delay time TDLY is corrected in accordance with the engine load EC and the exhaust temperature at step 122. As shown in FIG. 12, the mean value of the front $O_2$ period of times $T_{FR}$ is corrected by the engine load EC at step 124.

The mean value of the front $O_2$ period of time $T_{FR}$ is compared with a period at which the feedback correction amount is set as a deterioration judgment value by the control section 64, thereby discriminating whether $T_{FR} < a$ or not at step 126.

Figure 13:
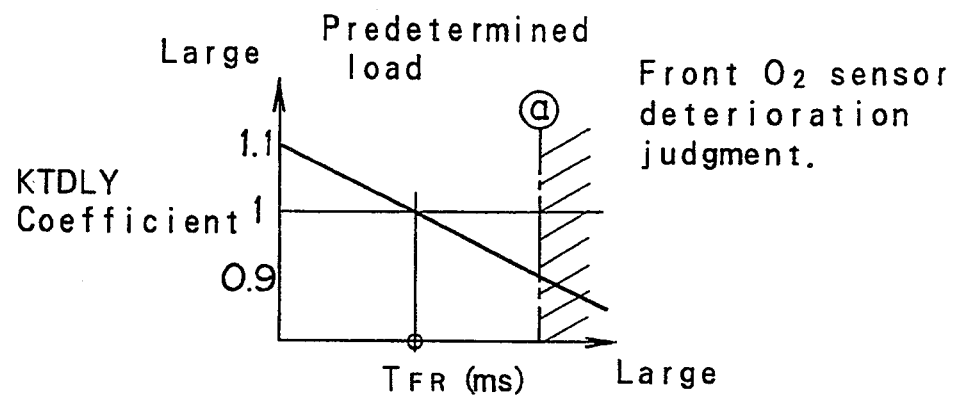
Figure 14:
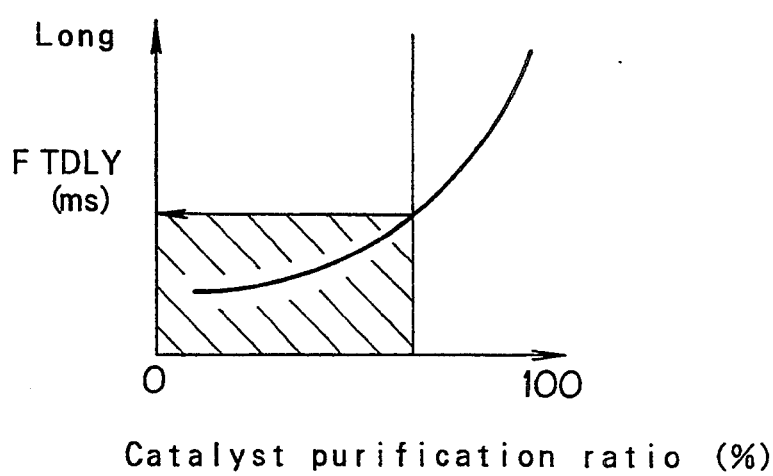

If NO at step 126, namely, when $T_{FR} \geq a$, it is decided that the front $O_2$ sensor 82 is deteriorated, so that the front $O_2$ sensor deterioration judgment and the catalyst deterioration judgment are stopped at step 128. The processing routine advances to end step 138 of the program. If YES at step 126, as shown in FIG. 13, a final deterioration judgment value FTDLY is calculated at step 130 by the sum of the rear $O_2$ sensor response delay time TDLY for judgment of the catalyst deterioration and a coefficient KTDLY on the basis of the following equation:

$$FTDLY = TDLY \times KTDLY$$

The calculated FTDLY is compared at step 132 with the deterioration judgment value (refer to a catalyst purification ratio in FIG. 14) which has been preset by the control section 64.

By comparing the calculated FTDLY and the deterioration judgment value, a check is made at step 134 to see if the catalyst material 28 of the catalytic converter 24 has been deteriorated or not. If NO at step 134, the processing routine advances to the end step 138 of the program. If YES at step 134, it is determined at step 136 that the catalyst material 28 in the catalytic converter 24 is abnormal. After step 136, the program is finished at step 138.

As for the variation characteristics of the front $O_2$ sensor 82, upon a deterioration judgment, by executing the following three operations, the variation $\Delta$TDLY on the measurement is reduced.

1. Dual $O_2$ sensor feedback control is stopped.
2. The sum of the rich judgment delay time $D_{LR}$ and the lean judgment delay time $D_{RL}$ is set to a predetermined value.
3. The feedback correction amount is set to a large value.

By correcting the engine load upon measurement, exhaust temperature, and variation characteristics of the $O_2$ sensors, the response delay time TDLY for judgment of the catalyst deterioration is accurately measured.

Due to this, the deterioration of the catalyst material 28 in the catalytic converter 24 and front $O_2$ sensor 82 can be accurately judged. By properly warning the user upon a deterioration judgment, the maintenance and inspection can be promptly performed. It is possible to prevent the unpurified exhaust gas from being exhausted into the atmosphere. The invention can contribute to the improvement of the environment.

Since the variation TDLY on the measurement can be reduced, the deterioration judging precision can be improved, an erroneous operation due to the deterioration judgment can be certainly prevented, and it is practically useful.

Further, since it is possible to cope with the embodiment by merely changing the program in the control section, the construction is not complicated, the apparatus can be easily manufactured, the costs can be reduced, and it is economically advantageous.

According to the invention as described in detail above, there is provided the control means having a judging function which is constructed in a manner such that upon a deterioration judgment, the feedback correction amount is set to be larger than that in the ordinary state, the dual exhaust sensor feedback control is stopped, the rich judgment delay time and the lean judgment delay time are set in accordance with the ratio at the time of the ordinary dual exhaust sensor feedback control so as to set the rich/lean judgment delay time to a predetermined value, the feedback correction amount is set to a deterioration judgment value, the second exhaust sensor response delay time is corrected by the engine load and the exhaust temperature, this value is corrected by the period of the first exhaust sensor period, the second exhaust sensor response delay time is compared with the deterioration judgment value, and the deterioration of the catalyst material is judged. Therefore, the deterioration of the catalyst material and first exhaust sensor can be accurately judged by the control means. By properly warning the user upon a deterioration judgment, maintenance and inspection can be promptly executed to prevent unpurified exhaust gas from being discharged into the atmosphere.

On the other hand, there is provided the control means having the function such that the rich judgment delay time and the lean judgment delay time are set in accordance with the ratio at the time of the ordinary dual exhaust sensor feedback control, and when the rich/lean judgment delay time is set to a predetermined value, the variation characteristics of the output performance of the first exhaust sensor are measured by the first exhaust sensor period of time, and the deterioration judgment value is corrected by the variation characteristics. Therefore, the variation on the measurement can be reduced. The deterioration judging precision can be improved. The erroneous operation due to the deterioration judgment can be prevented.

Further, since it is possible to cope with the embodiment by merely changing the program in the control means, the construction is not complicated, the apparatus can be easily manufactured, the costs can be reduced, and it is economically advantageous.

FIGS. 18–40

FIGS. 18 to 40 show a second embodiment of the present invention.

Figure 18:
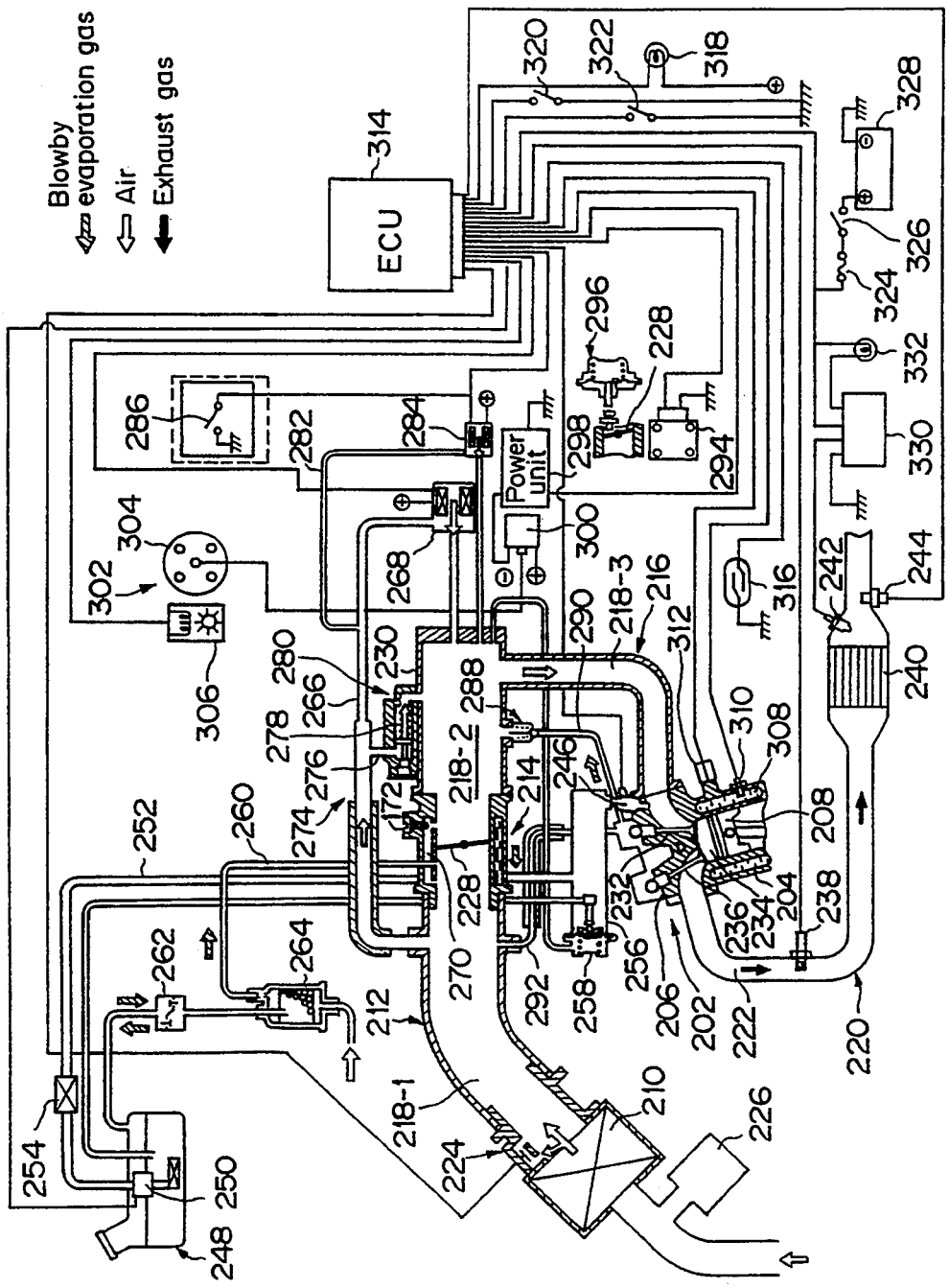

In FIG. 18, reference numeral 202 denotes an internal combustion engine having a fuel injection system of the electronic control type and a catalyst deterioration judging apparatus; 204 a cylinder block; 206 a cylinder head; 208 a piston; 210 an air cleaner; 212 an intake pipe; 214 a throttle body; 216 an intake manifold; 218 an intake passage; 220 an exhaust pipe; and 222 an exhaust passage.

An air flow meter 224 to measure an intake amount is provided on the intake pipe 212 interposed between the air cleaner 210 and the throttle body 214, which pipe 212 forms a first intake passage 218-1.

A resonator 226 to reduce the intake air sound is provided on the upstream side of the air cleaner 210. An intake throttle valve 228 is arranged in a second intake passage 218-2 which is formed in the throttle body 214 and communicates with the first intake passage 218-1. The second intake passage 218-2 communicates with a third intake passage 218-3 formed in the intake manifold 216 through a surge tank 230. The downstream side of the third intake passage 218-3 communicates with a combustion chamber 234 of the internal combustion engine 202 through an intake valve 232. The exhaust passage 222 communicates with the combustion chamber 234 through an exhaust valve 236.

A front $O_2$ sensor 238 (as a first exhaust sensor with a heater), a catalyst material 240, and a thermo fuse 242 are sequentially associated with the exhaust pipe 220 in the downstream flow direction. The front $O_2$ sensor 238 is provided on the exhaust passage 222 on the upstream side of the catalyst material 240 and detects oxygen concentration in the exhaust passage 222 and generates a first detection signal (refer to FIG. 21).

A rear $O_2$ sensor 244 (as a second exhaust sensor) is provided on the exhaust passage 222 on the downstream side of the catalyst material 240. The rear $O_2$ sensor 244 detects oxygen concentration in the exhaust passage 222 on the downstream side of the catalyst material 240 and generates a second detection signal (refer to FIG. 21).

A fuel injection valve 246 is attached to a junction portion of the intake manifold 216 and the cylinder head 206 so as to be directed toward the combustion chamber 246.

The fuel in a fuel tank 248 is supplied with pressure to the fuel injection valve 246. That is, the fuel in the fuel tank 248 is supplied with pressure to a fuel supply passage 252 by a fuel pump 250 and is filtered by a fuel filter 254 and is fed to a fuel distributing pipe 256. The pressure of the fuel is adjusted to a predetermined value by a fuel pressure adjuster 258. After that, the fuel is fed to the fuel injection valve 246.

One end of an evaporation fuel passage 260 communicates with an upper portion of the fuel tank 248. The other end of the passage 260 communicates with the second intake passage 213-2 of the throttle body 214. A two-way valve 262 and a canister 264 are sequentially provided in the evaporation fuel passage 260 in this order from the fuel tank 248 side.

A bypass air passage 266 is provided for bypassing the intake throttle valve 228 so as to communicate the first intake passage 218-1 and the inside of the surge tank 230. An idle rotational speed control valve (ISC valve) 268 adjusts the bypass air amount by opening or closing the bypass air passage 266.

An auxiliary bypass air passage 270 for bypassing the intake throttle valve 228 is formed in the throttle body 214. The auxiliary bypass air passage 270 is opened or closed by an auxiliary bypass air amount adjusting device 272.

Due to this, an idle rotational speed control unit 274 is constructed by the bypass air passage 66, idle rotational speed control valve 268, auxiliary bypass air passage 270, and auxiliary bypass air adjusting device 272.

The idle rotational speed control unit 274 feedback controls the idle rotational speed of the internal combustion engine 202 to a target idle rotational speed by the control valve 268. The control unit 274 also adjusts the target idle rotational speed by the auxiliary bypass adjusting device 272.

An air passage 276 communicates between the inside of the surge tank 230 and the bypass air passage 266. An air valve 278 which operates in accordance with the temperature of the cooling water of the engine or the like controls flow through the air passage 276. The air passage 274 and air valve 276 constitute an air regulator 280.

An air passage 282 for power steering communicates between the inside of the surge tank 230 and the bypass air passage 266. A control valve 284 for power steering is interposed in the air passage 282. The operation of the control valve 284 is controlled by a power steering switch 286.

To reflux the blowby gas generated in the internal combustion engine 202 to the intake system, a first blowby gas reflux passage 290 communicates with a PCV valve 288 attached to the surge tank 230, and a second blowby gas reflux passage 292 communicates with the first intake passage 218-1, which passages 290 and 292 communicate with the cylinder head 206.

A throttle sensor 294 is provided to detect an opening degree state of the intake throttle valve 228. A dash pot 296 is provided to prevent sudden closing of the intake throttle valve 228.

An ignition coil 300 connected with a power unit 298 is connected to a distributor 304 constructing an igniting mechanism 302.

A crank angle sensor 306 is provided to detect the crank angle of the internal combustion engine 202.

A water temperature sensor 310 to detect the temperature of the cooling water of the engine in a cooling water passage 308 formed in the cylinder block 204 and a knock sensor 312 to detect the knock state of the internal combustion engine 202 are attached to the cylinder block 204.

The air flow meter 224, front $O_2$ sensor 238, rear $O_2$ sensor 244, fuel injection valve 246, fuel pump 250, idle rotational speed control valve 268, power steering control valve 284, power steering switch 286, throttle sensor 294, power unit 298, crank angle sensor 306, water temperature sensor 310, and knock sensor 312 are connected to control means (i.e. engine control unit ECU) 314.

A vehicle velocity sensor 316, a diagnosis lamp 318, a diagnosis switch 320, a test switch 322, a battery 328 connected through a fuse 324 and a main switch 326, and an alarm lamp 332 connected through an alarm relay 330, are all connected to the control means 314. The thermo fuse 242 is connected to the alarm relay 330.

The control means 314 controls in a manner such that as various detection signals from various sensors are supplied, the air-fuel ratio is dual feedback controlled by a predetermined correction amount by judging a deterioration state of the catalyst material 240 (refer to FIG. 22), and when catalyst deterioration judging conditions are satisfied, a second feedback control value is set in correspondence to a second feedback control value in the case where the catalyst deterioration judging conditions are not satisfied, namely, in the ordinary state, the sum of a rich inversion delay time and a lean inversion delay time is set to a predetermined value, a ratio of a rich inversion delay time and a ratio of a lean inversion delay time are set to be equal, a correction amount of the feedback control value is set to be larger than that in the case where the catalyst deterioration judging conditions are not satisfied, and an integration judging time of the second feedback control value in the case where the catalyst deterioration judging conditions are satisfied is set to be shorter than that in the case where the catalyst deterioration judging conditions are not satisfied.

Figure 23:
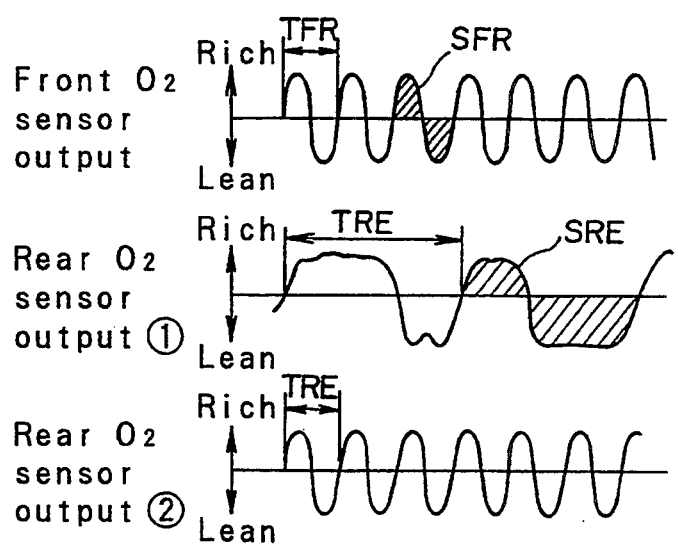
Figure 25:
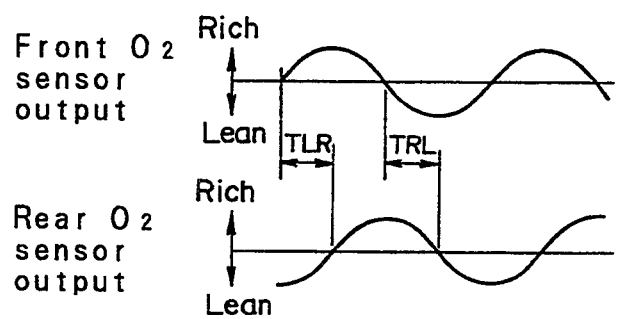

The gist of the invention of this second embodiment will now be described in detail. As a catalyst deterioration judging method, as shown in FIG. 25, there is a method of judging by a response delay time each of the detection signals of the front $O_2$ sensor 238 and the rear $O_2$ sensor 244. Or, as shown in FIG. 23, there is a method of judging by an area ratio of each detection signal in an imitation manner.

Figure 26:
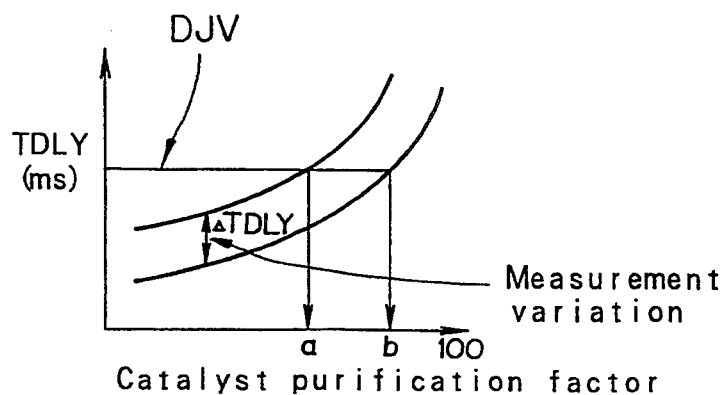
Figure 37:
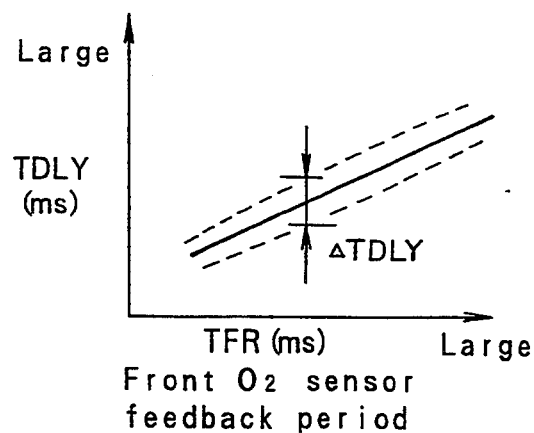
Figure 38:
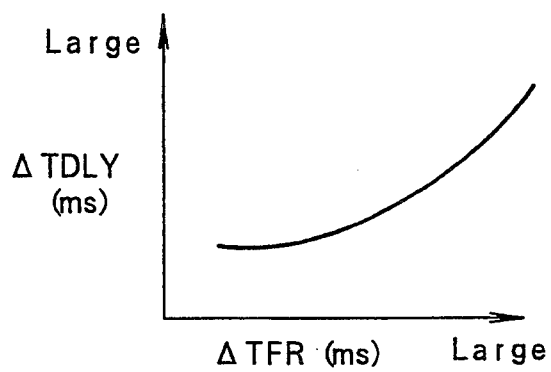
Figure 39:
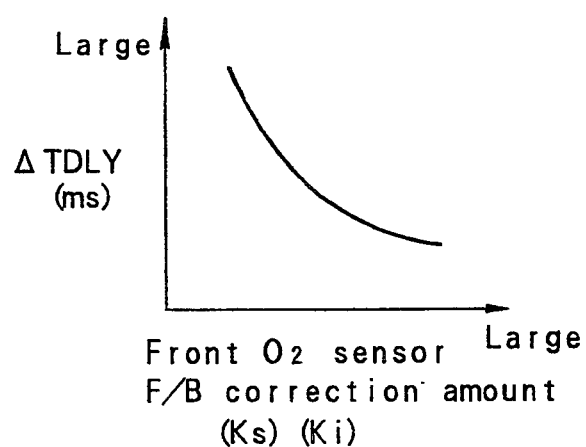

In the embodiment, as shown in FIG. 25, the catalyst deterioration is judged by response delay times (TDLY) of the front $O_2$ sensor 238 and the rear $O_2$ sensor 244. As shown in FIG. 23, a second detection signal from the rear $O_2$ sensor 244 is influenced by a catalyst purification factor of the catalyst located upstream of the sensor. When the catalyst purification factor is good, the response delay time (TDLY) of the catalyst material 240 is long, namely, the delay time of the second detection signal of the rear $O_2$ sensor 244 relative to the first detection signal of the front $O_2$ sensor 238 is long. As shown in FIG. 37, the response delay time (TDLY) shown in FIG. 25 changes in dependence on a F/B period (TFR) of the first detection signal from the front $O_2$ sensor 238. As shown in FIG. 26, a measurement variation ($\Delta$TDLY) of the response delay time (TDLY) is influenced by a variation of the period (TFR) of the first detection signal from the front $O_2$ sensor 238. Moreover, as shown in FIGS. 238 and 239, the measurement variation ($\Delta$TDLY) of the response delay time (TDLY) is also influenced by the correction amount of the first feedback control value.

Figure 27:
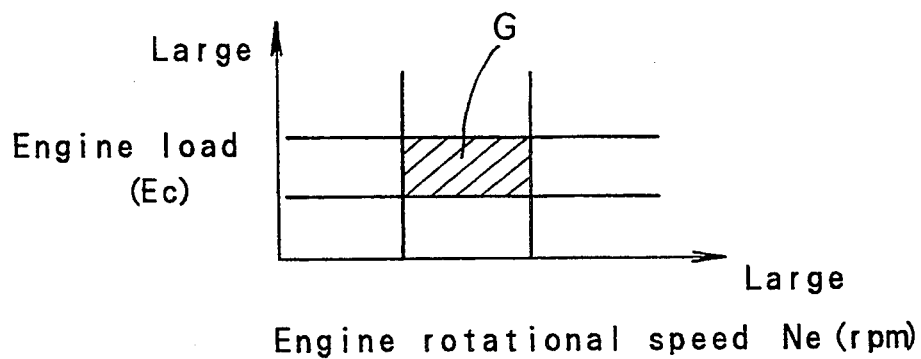

As shown in FIG. 27, the catalyst deterioration judging conditions are satisfied in the cases where: the first feedback control is being executed (main feedback is being executed); the second feedback control is being executed (dual feedback is being executed); when within a deterioration judging region G due to the engine rotational speed and the engine loads; the warming-up of the internal combustion engine 202 has been completed; the intake temperature $\geq$ set value; and a predetermined velocity.

Figure 24:
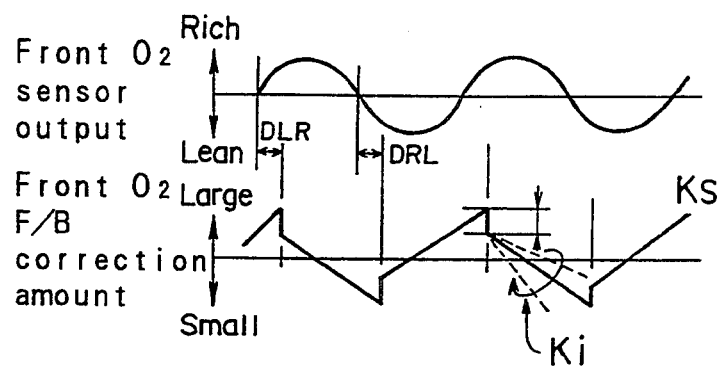
Figure 33:
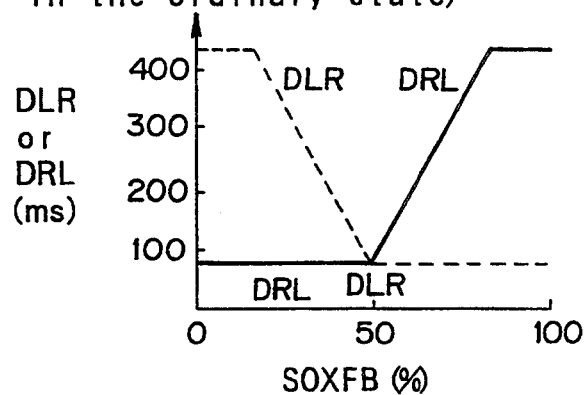
Figure 34:
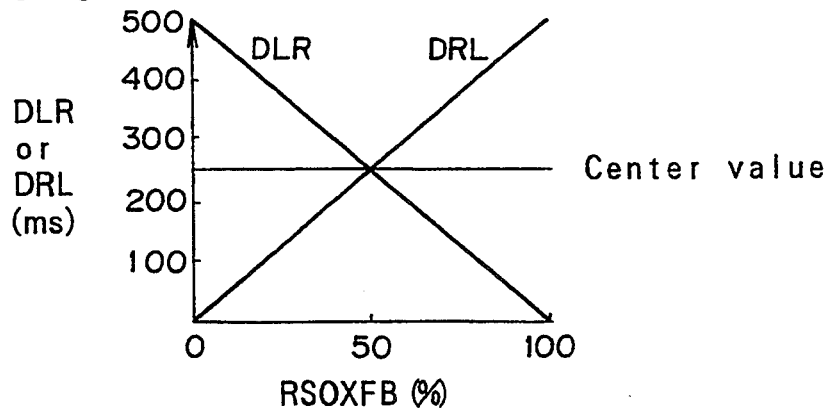

Rich/lean inversion delay times (DLR, DRL) in FIG. 33 are changed to predetermined rich/lean inversion delay times (DIR, DRL) in correspondence to the second feedback control value (refer to FIG. 33) in the ordinary state at a time of the deterioration judgment in FIG. 34, namely, when the catalyst deterioration judging conditions are satisfied. In this instance, the sum of the rich inversion delay time (DLR) and the lean inversion delay time (DRL) is set to a predetermined value (for example, 500 msec) and a control mode is switched so that a ratio of the rich inversion delay time (DLR) and a ratio of the lean inversion delay time (DRL) are set to be equal in accordance with FIG. 35. As shown in FIG. 24, correction amounts ($K_s$ and $K_i$) of the first feedback control value are set to be larger than those in the ordinary state because of the reasons of FIG. 39.

Figure 36:
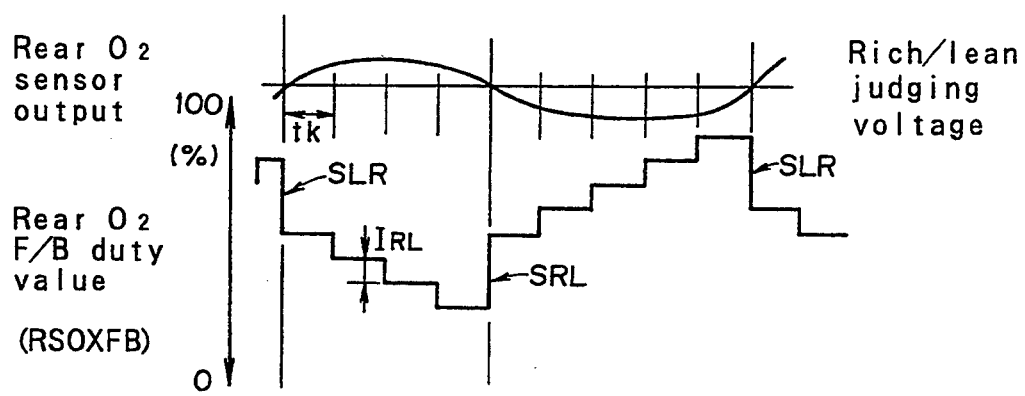
Figure 40:
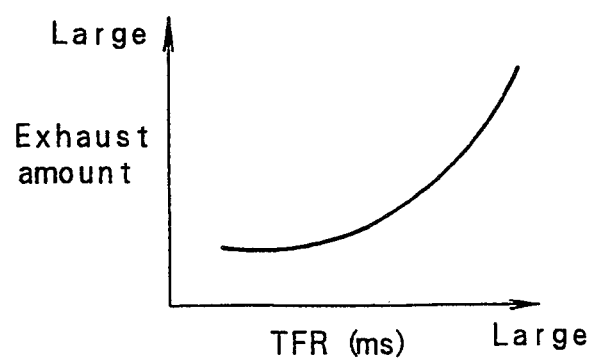

An integration judging time ($t_k$) in FIG. 36 is set for judgment of the deterioration. In order to stabilize the measurement of the response delay time (TDLY) upon judgment of the deterioration, it is necessary that a period (TFR) of the first detection signal from the front $O_2$ sensor 238 is set to be longer than that in the ordinary state. However, when the period (TFR) of the first detection signal is long, an exhaust amount increases as shown in FIG. 40. Therefore, control response time is reduced and deterioration judging time is decreased.

Each time of the rich/lean inversion of the second detection signal from the rear $O_2$ sensor 244, a skip correction is performed. An integration correction is executed every $t_k$ time. The rich/lean inversion delay times (DRL/DLR) of the first detection signal from the front $O_2$ sensor 238 are set and controlled in accordance with FIG. 34 by a second feedback control value (RSOXFB) upon deterioration judgment at that time. The response delay time (TDLY) of the second detection signal from the rear $O_2$ sensor 244 in FIG. 25 is measured.

The operation of this embodiment will now be described on the basis of the flowcharts of FIGS. 19 and 20.

Figure 19:
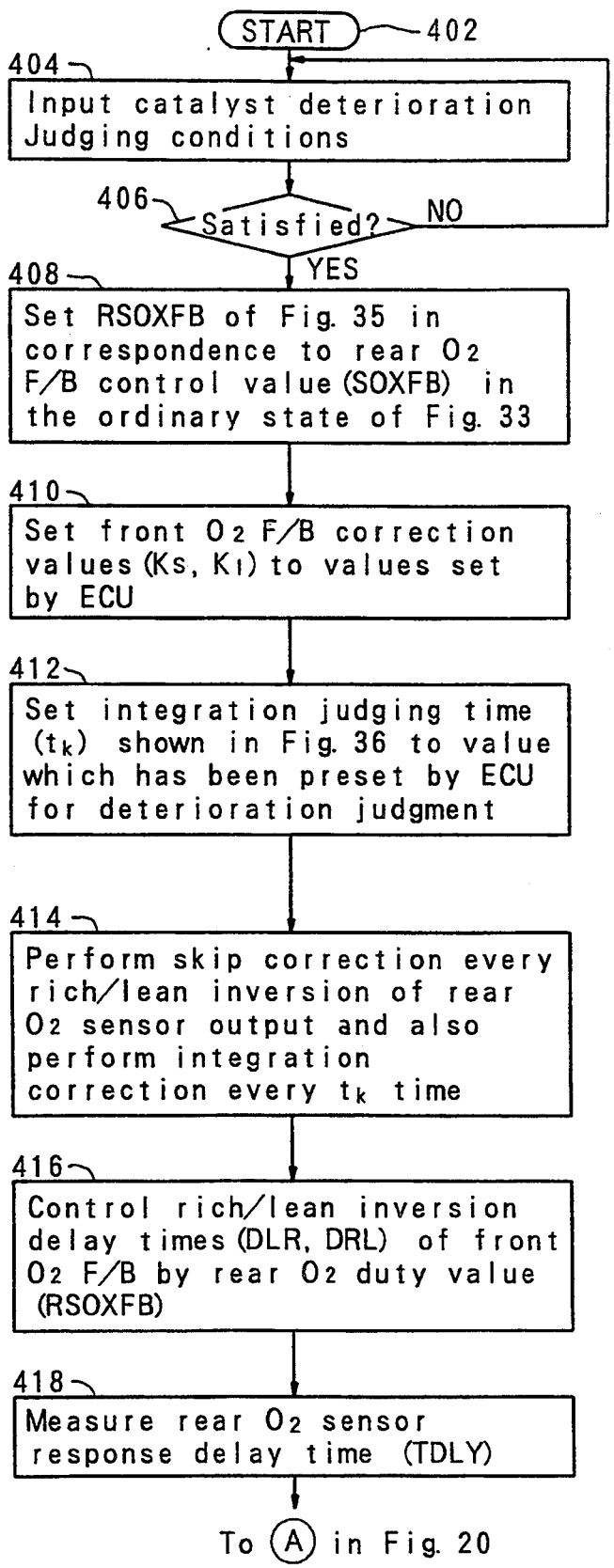
Figure 20:
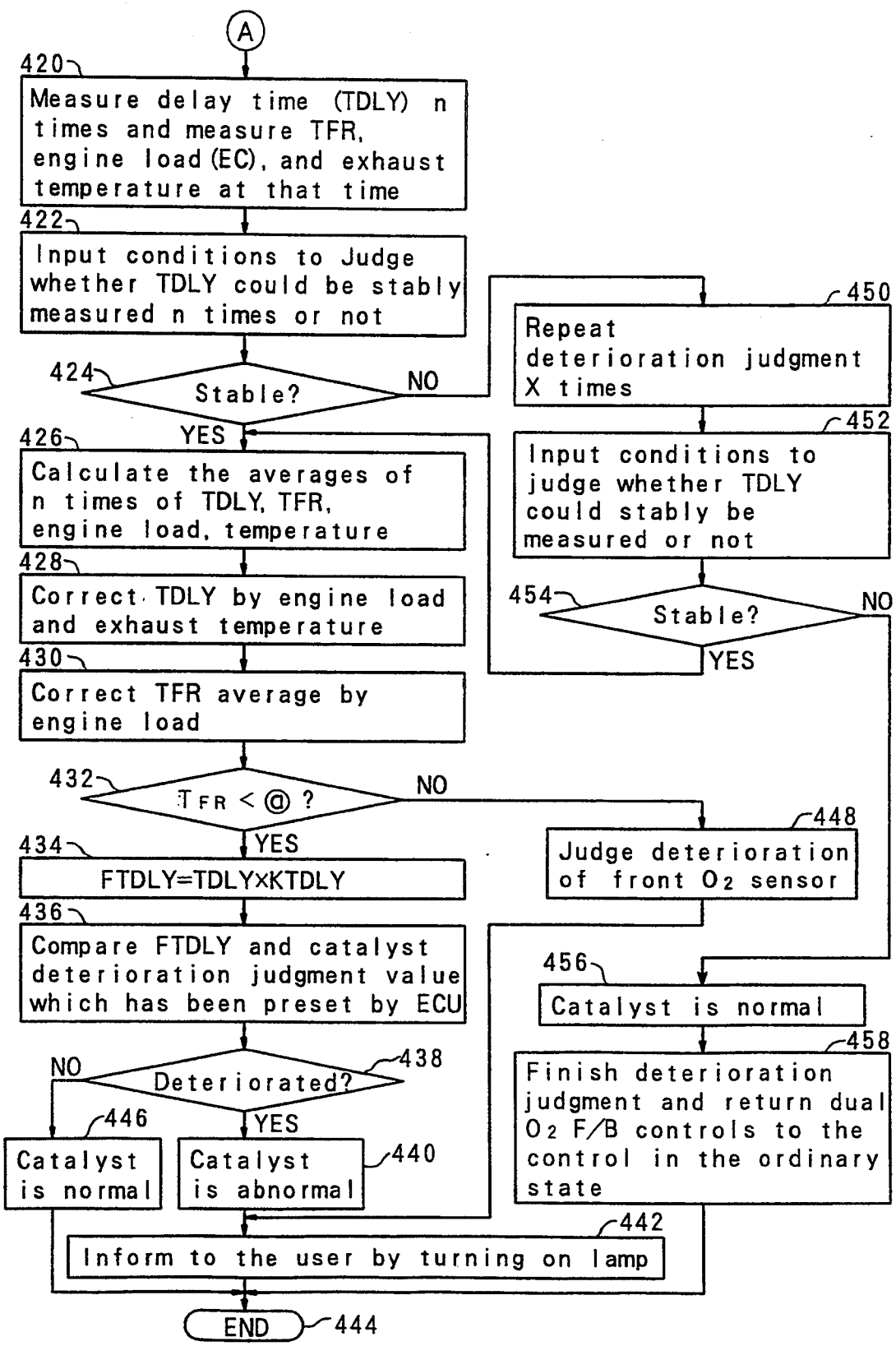
Figure 21:
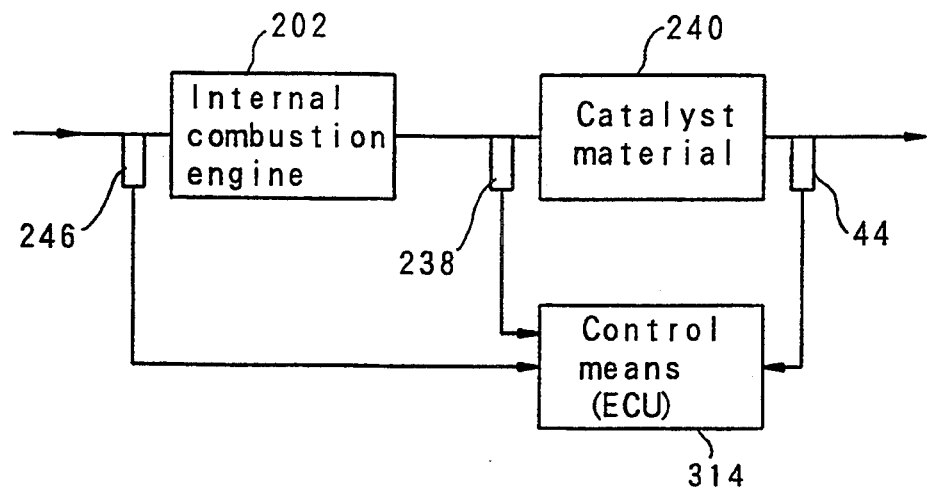
Figure 22:

In the control means, as shown in FIG. 19, when the internal combustion engine 202 is started, a program is started (step 402). First, the catalyst deterioration judgment satisfying conditions shown in FIG. 27 are received (step 404). The catalyst deterioration judging conditions are satisfied as shown in FIG. 27 in the case where the following conditions are satisfied: the first (main) feedback control is being executed; the dual feedback controls are being executed; within the region G; the warming-up of the internal combustion engine 202 has been completed; the intake temperature $\geq$ the set value; and predetermined velocity.

A check is made to see if the catalyst deterioration judging conditions are satisfied or not (step 406). If NO in step 406, the judging routine is continued.

Figure 35:
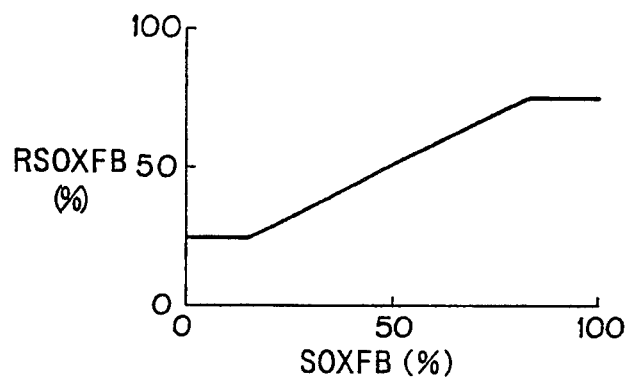

If YES in step 406, in correspondence to a second (rear) feedback control value (SOXFB) in the ordinary state shown in FIG. 33, the second feedback control value (RSOXFB) in FIG. 35 upon judgment of the deterioration in the case where the catalyst deterioration judging conditions are satisfied is newly set (step 408). In this instance, the sum of the rich inversion delay time (DLR) and the lean inversion delay time (DRL) is set to a predetermined value (for instance, 500 msec) and the ratio of the rich inversion delay time (DLR) and the ratio of the lean inversion delay time (DLR) are set to be equal (refer to FIG. 35).

Subsequently, the correction amounts ($K_s$ and $K_i$) of the first (front) feedback control value are set to a predetermined value set in the control means (step 410) as shown in FIG. 24. In this instance, to stabilize the measurement of the response delay time (TDLY), its predetermined time, namely, a correction amount of the first feedback control value is set to be larger than that in the ordinary state.

The integration judging time ($t_k$) shown in FIG. 36 is now set into a value which has been preset into the control means 314 for deterioration judgment (step 412). That is, when the catalyst deterioration judging conditions are satisfied, since the period of the feedback control is longer than that in the ordinary state, the control response time is reduced and the deterioration judging time is decreased.

As shown in FIG. 36, every rich/lean inversion of the second detection signal from the rear $O_2$ sensor 244, the skip correction is executed, and every $t_k$ time, the integration correction is performed (step 414).

As shown in FIG. 34, the rich/lean inversion delay times (DLR, DRL) of the first detection signal of the front $O_2$ sensor 238 are controlled by the second feedback control value (RSOXFB) upon judgment of the deterioration (step 416).

As shown in FIG. 25, the response delay time (TDLY) of the rear $O_2$ sensor 244 is measured (step 418).

The reason why the response delay time (TDLY) is measured as mentioned above is because it is necessary that the periods of time of the detection signals from the front $O_2$ sensor 238 and the rear $O_2$ sensor 244 are almost equal. Therefore, in the case where the rear $O_2$ sensor 244 is not so deteriorated, the period of time of the signal of the front $O_2$ sensor 238 needs to be set to a long value. For this purpose, the values of the correction amounts (skip value $K_s$, integration value $K_i$) of the first feedback control value are changed.

Explanation will now be made with reference to the flowchart shown in FIG. 20. The response delay time (TDLY) is measured n times, and the period (TFR) of the first detection signal of the front $O_2$ sensor 238 at that time, an engine load (EC), and an exhaust temperature are measured (step 420).

Conditions to discriminate whether the response delay time (TDLY) could stably be measured n times or not are inputted (step 422).

Figure 29:
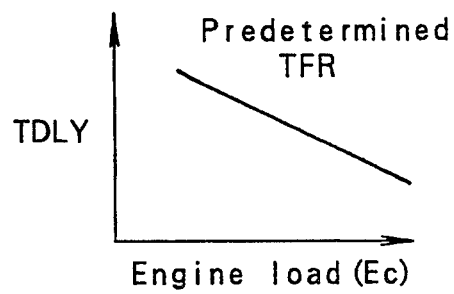
Figure 30:
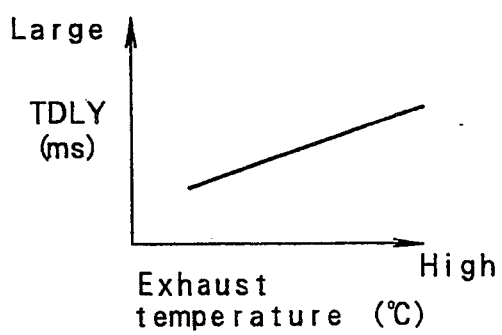
Figure 31:
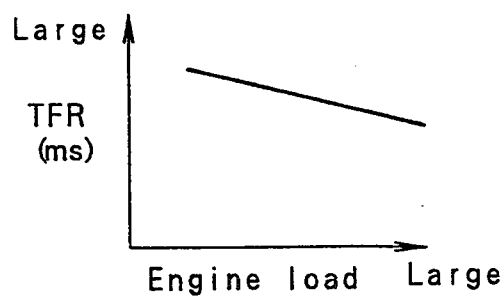

A check is now made to see if the response delay time (TDLY) has stably been measured or not (step 414). If YES in step 424, the averages of n times of the period (TFR) of the first detection signal of the front $O_2$ sensor 238, engine load, and exhaust temperature are calculated (step 426). As shown in FIGS. 29 and 30, the response delay time (TDLY) is corrected in accordance with the engine load and the exhaust temperature (step 428). The reason why the response delay time (TDLY) is corrected by the engine load, exhaust temperature, and the like is because the response delay time (TDLY) changes due to a flow speed of the exhaust or a response time of the catalyst material 240. A correction base assumes 1.0. The average of the period (TFR) of the first detection signal of the front $O_2$ sensor 238 is corrected by the engine load as shown in FIG. 31 (step 430).

Figure 28:
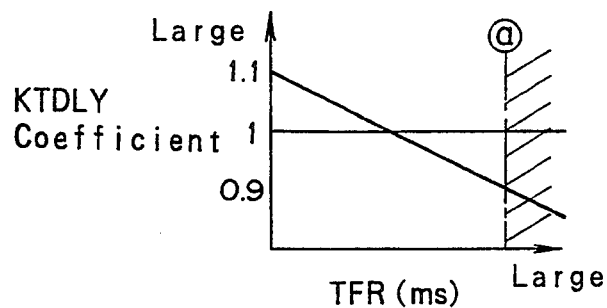
Figure 32:
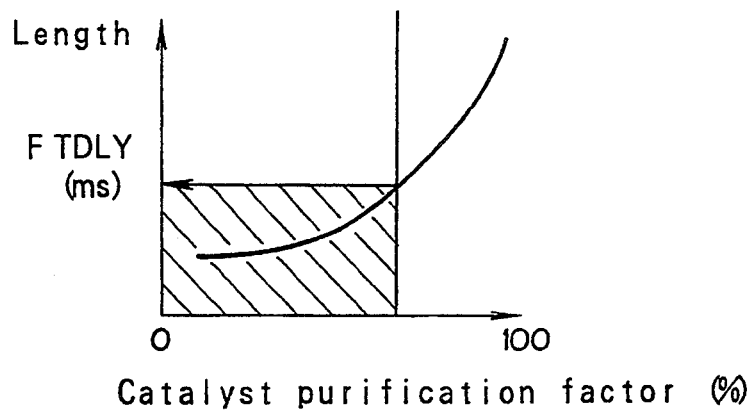

As shown in FIG. 28, a check is made to see if TFR<a or not (step 432). A calculation such that final response delay time (FTDLY)=response delay time (TDLY)×coefficient (KTDLY) is executed (step 434). As shown in FIG. 32, the final response delay time (FTDLY) is compared with the response delay time which has been preset in the control means 314 (step 436).

A check is made to see if the catalyst material 240 has been deteriorated or not (step 438). If YES in step 438, it is determined that the catalyst is abnormal (step 440). Such a fact is informed to the user by lighting up a lamp or the like (step 442). The program is finished (step 444).

If NO in step 438, it is decided that the catalyst is normal (step 446). The program is finished (step 444).

If NO in step 432, a deterioration of the front $O_2$ sensor 238 is discriminated (step 448). The processing routine advances to step 442.

If NO in step 424, the deterioration judgment is repeated n times (step 450). Conditions to discriminate whether the response delay time (TDLY) could stably be measured or not are inputted (step 452). A check is made to see if the measurement becomes stable or not (step 454).

If YES in step 452, the processing routine is returned to step 426 and the subsequent control is executed.

On the other hand, if NO in step 454, it is decided that the catalyst is normal (step 456). Namely, in the case where the response delay time (TDLY) doesn't become stable even by repeating the catalyst deterioration X-times, this means that front $O_2$ sensor 238 is not deteriorated. Therefore, even if the correction is performed, the period of the front $O_2$ sensor is not equal to the period of the rear $O_2$ sensor 244 and the values vary, so that the catalyst material 240 is normal.

The deterioration judgment is finished and the second feedback control upon judgment of the deterioration is returned to the dual feedback controls in the ordinary state (step 458). The program is finished (step 444).

Thus, the deterioration judging precisions of the catalyst material 240 and each of the $O_2$ sensors 238 and 244 can be improved, namely, the measuring precision of the response delay time (TDLY) can be improved.

Upon deterioration judgment, since the second feedback control upon deterioration judgment has been changed so as to be different from that in the ordinary state, the measurement variation ($\Delta$TDLY) of the deterioration judgment is reduced and the deterioration judging precision can be improved.

Further, the switching of the second feedback control values in the ordinary state and the deterioration judgment is executed so as to set the ratio between the rich/lean inversion delay time (DRL, DLR) to a predetermined value, so that the generation amount of the exhaust harmful components upon switching of the dual feedback control can be reduced.

Furthermore, since a control is performed so that the sum (DLR+DRL) of the rich/lean inversion delay times upon deterioration judgment is always set to a predetermined value, the period (TFR) of the first detection signal from the front $O_2$ sensor 238 is set to a predetermined value and the measurement variation ($\Delta$TDLY) of the response delay time (TDLY) can be reduced.

Since the deterioration judging precision is also improved, a confusion in the market due to the erroneous operation of the deterioration judgment can be eliminated.

Further, since the integration judging time of the second feedback control value upon deterioration judgment has been set to be shorter than that in the ordinary state, the generation exhaust amount can be decreased.

As will be understood from the above detailed description, according to this embodiment of the invention, there is provided the control means for controlling in a manner such that when the catalyst deterioration judging conditions are satisfied, the second feedback control value upon a deterioration judgment is set in correspondence to the second feedback control value in the case where the catalyst deterioration judging conditions are not satisfied, namely, in the ordinary state, the sum of the rich inversion delay time and the lean inversion delay time is set to a predetermined value, the ratio of the rich inversion delay time and the ratio of the lean inversion delay time are set to be equal, the correction amount of the first feedback control value is set to be larger than that in the case where the catalyst deterioration judging conditions are not satisfied, and the integration judging time of the second feedback control value in the case where the catalyst deterioration judging conditions are satisfied is set to be shorter than that in the case where the catalyst deterioration judging conditions are not satisfied. Therefore, the deterioration judging precisions of the catalyst material and each exhaust sensor are improved. A variation amount of the catalyst deterioration measurement is reduced in the case where the catalyst deterioration judging conditions are satisfied. When the second feedback control values in the cases where the catalyst deterioration judging conditions are not satisfied and where they are satisfied are switched, the generation amount of the exhaust harmful components can be reduced and a variation in the catalyst deterioration judgment value can be also decreased.

FIGS. 41–53

FIGS. 41 to 53 show a third embodiment of a catalyst deterioration judging apparatus according to the present invention.

Figure 41:
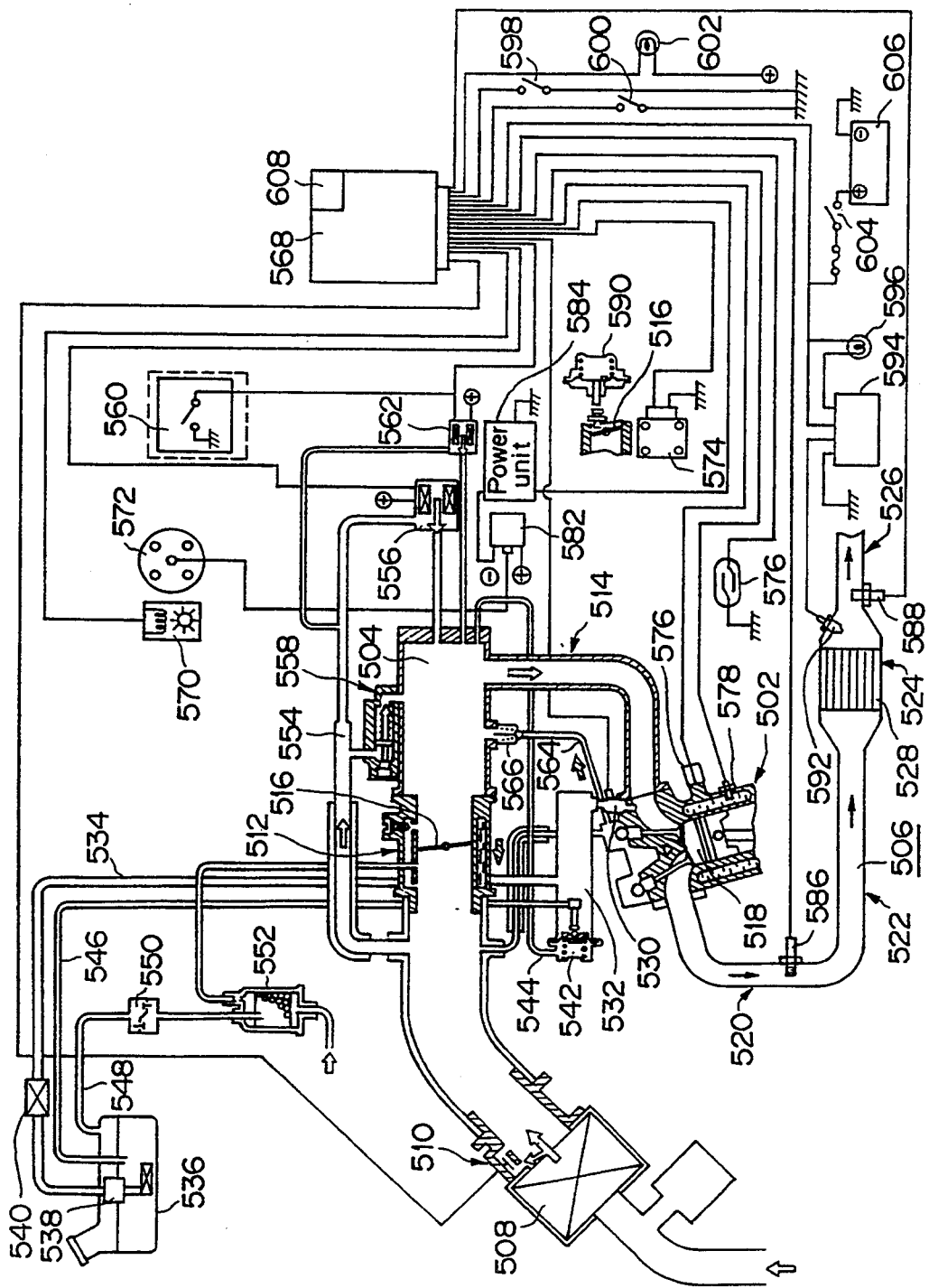

In FIG. 41, reference numeral 502 denotes an internal combustion engine; 504 an intake passage; and 506 an exhaust passage. The intake passage 504 is formed by an air cleaner 50S, an air flow meter 510, a throttle body 512, and an intake manifold 514 which are sequentially connected from the upstream side. The intake passage 504 in the throttle body 512 has an intake throttle valve 516. The intake passage 504 is communicated with a combustion chamber 518 of the internal combustion engine 502.

The exhaust passage 506 communicates with the combustion chamber 518 and is formed by an exhaust manifold 520, an upstream side exhaust pipe 522, a catalytic converter 524, and a downstream side exhaust pipe 526 which are sequentially connected from the upstream side. The exhaust passage 506 in the catalytic converter 524 has a catalyst material 528.

The internal combustion engine 502 has a fuel injection valve 530 which is directed toward the combustion chamber 518. The fuel injection valve 530 is communicated with a fuel tank 536 through a fuel distributing passage 532 by a fuel supply passage 534. The fuel in the fuel tank 536 is fed with pressure by a fuel pump 538. Dusts are eliminated from the fuel by a fuel filter 540 and, after that, the fuel is supplied to the fuel distributing passage 532 by the fuel supply passage 534 and is distributed and supplied to the fuel injection valve 530.

The fuel distributing passage 532 has a fuel pressure adjusting section 542 to adjust pressure of the fuel. The fuel pressure adjusting section 542 adjusts the fuel pressure to a predetermined value by the intake atmospheric pressure which is introduced from a connecting passage 544 communicating with the intake passage 504 and returns the surplus fuel to the fuel tank 536 by a fuel return passage 546.

The fuel tank 536 is provided so as to be communicated with the intake passage 504 of the throttle body 512 by an evaporation fuel passage 548. A two-way valve 550 and a canister 552 are interposed on the way of the evaporation fuel passage 548. The throttle body 512 has a bypass passage 554 which bypasses the intake throttle valve 516. An idle air amount control valve 556 is interposed on the way of the bypass passage 554. Reference numeral 558 denotes an air regulator; 560 a power steering switch; 562 an air amount control valve for the power steering; 564 a blowby gas passage; and 566 a PCV valve.

The air flow meter 510, fuel injection valve 530, idle air amount control valve 556, and air amount control valve 562 for the power steering are connected to a control section 568 as a control means. A crank angle sensor 570, a distributor 572, an opening degree sensor 574 of the intake throttle valve 518, a knock sensor 576, a water temperature sensor 578, and a vehicle velocity sensor 580 are connected to the control section 568, respectively. Reference numeral 582 denotes an ignition coil and 584 indicates a power unit for ignition.

In the internal combustion engine 502, a first $O_2$ sensor 586 and a second $O_2$ sensor 588 for detecting oxygen concentration as an exhaust component value are provided on the exhaust passage 506 on the upstream side and downstream side of the catalyst material 528. The first and second $O_2$ sensors 586 and 588 are connected to the control section 568.

Figure 43:
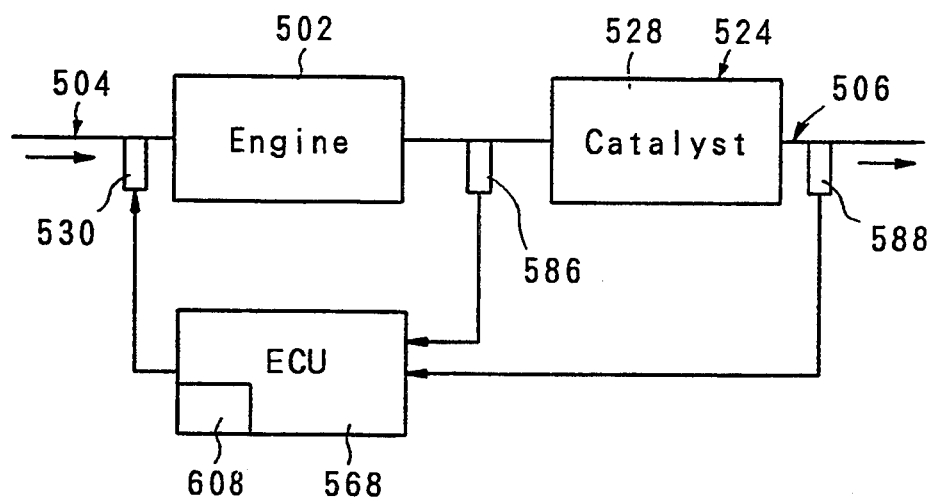

As shown in FIG. 43, the control section 568 performs the first feedback control to the operation of the fuel injection valve 530 so as to set an air fuel ratio to a target value on the basis of the first detection signal which is generated from the first $O_2$ sensor 586 and also performs the second feedback control so as to correct the first feedback control by a second detection signal which is generated from the second $O_2$ sensor 588.

Reference numeral 590 denotes a dash pot; 592 a thermo fuse; 594 an alarm relay; 596 an alarm lamp; 598 a diagnosis switch; 600 a TS switch; 602 a diagnosis lamp; 604 a main switch; and 606 a battery.

In such an internal combustion engine 502, the control section 568 has a judging section 608 to perform an arithmetic operation to judge a deterioration state of the catalyst material 528. The judging section 608 executes arithmetic operations in a manner such that in the case where predetermined deterioration judgment performing conditions are satisfied, the number of first detection signal periods and the number of second detection signal periods in a predetermined arithmetic operating time TCAL are measured from periods of time TFR and TRE during which the first detection signal of the first $O_2$ sensor 586 and the second detection signal of the second $O_2$ sensor 588 are inverted, thereby calculating a period ratio SHUKI, a first detection signal surrounding area and a second detection signal surrounding area in the predetermined arithmetic operating time TCAL are measured from areas SFR and SRE surrounded by the periods of time TFR and TRE during which the first and second detection signal are inverted, thereby calculating an area ratio SR, an engine load and an exhaust temperature as operation state values in the predetermined arithmetic operating time TCAL are measured from the operating state of the internal combustion engine 2, thereby calculating a correction value α, a deterioration judgment arithmetic operation value REK in which the period ratio SHUKI and the area ratio SR have been corrected by the correction value α is obtained, and the deterioration state of the catalyst material 528 is judged by the deterioration judgment arithmetic operation value REK.

Namely, the judging section 608 calculates the period ratio SHUKI and the area ratio SR from the periods of time TFR and TRE of the first and second detection signals of the first and second O₂ sensors 586 and 588, thereby judging the deterioration state of the catalyst material 528 in an imitation manner.

Figure 42:
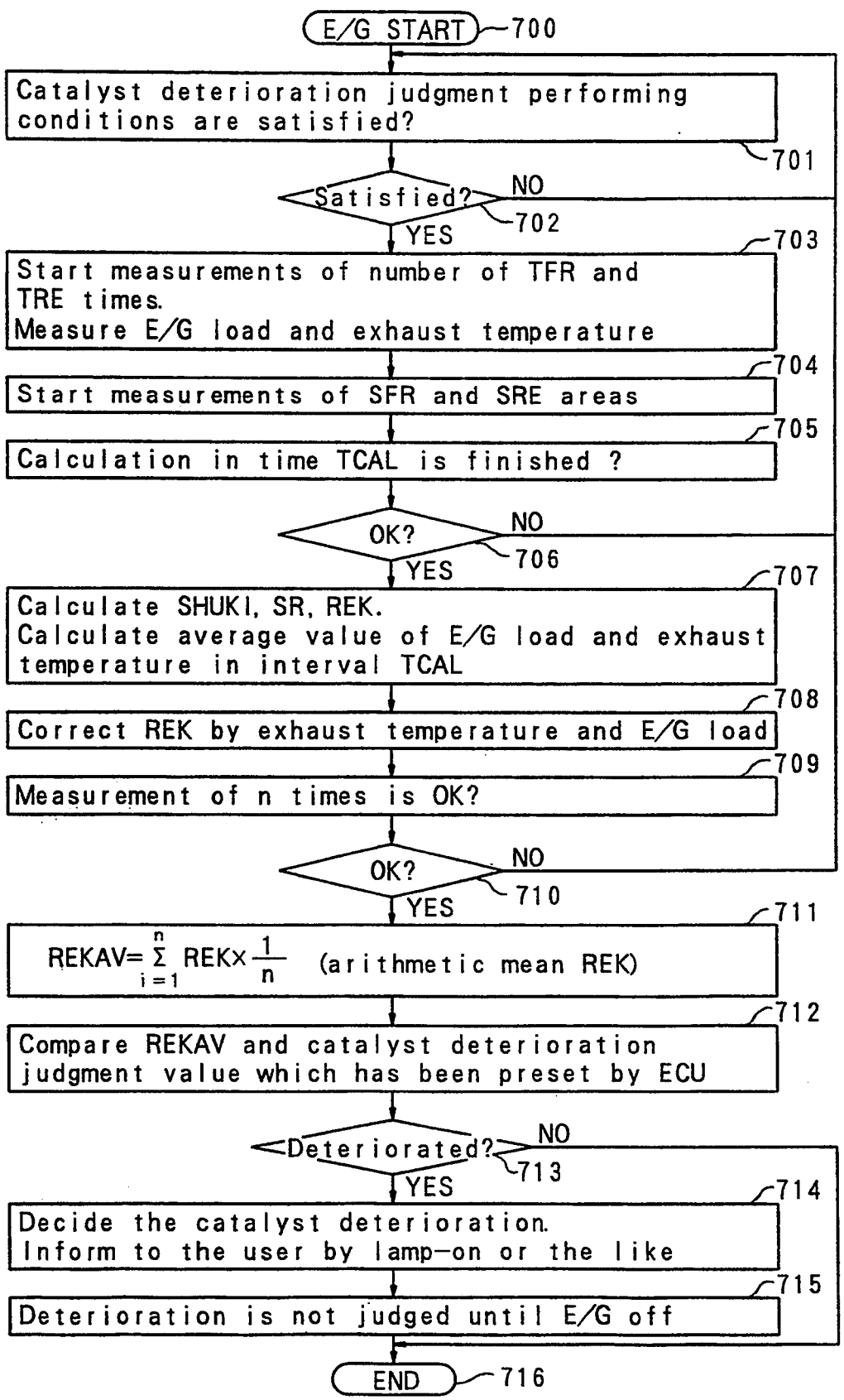

The judgment of the catalyst deterioration judging apparatus will now be described in accordance with FIG. 42.

Figure 51:
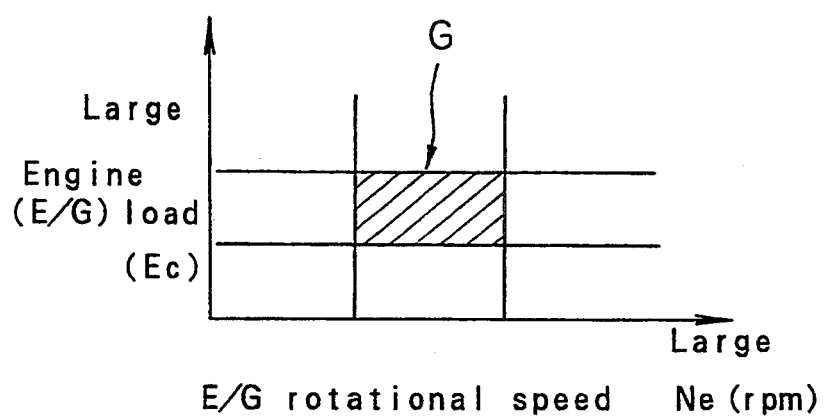

When the internal combustion engine 502 is started (step 700), predetermined catalyst deterioration judgment performing conditions are read (step 701) and a check is made to see if the catalyst deterioration judgment performing conditions are satisfied or not (step 702). As shown in FIG. 51, the catalyst deterioration judgment performing conditions are judged by checking whether all of the following conditions are satisfied or not: that is, the first feedback control is being executed by the first O₂ sensor 586; the second feedback control is being executed by the second O₂ sensor 588; those conditions lie within a catalyst deterioration judgment area which is set by an engine load $E_c$ and an engine rotational speed $N_e$; the warming-up of the internal combustion engine 502 has been completed; an intake air temperature is equal to or higher than a set value (intake air temperature $\geq$ set value); and at a predetermined velocity (a change in engine load $E_c$ such as intake air amount, opening degree of throttle valve, fuel injection amount, or the like is equal to or less than a set value).

In the above judgment (step 702), when either one of the above conditions is not satisfied and the answer is NO, the processing routine is returned to the reading of the catalyst deterioration judgment performing conditions (step 701). In the judgment (step 702), when all of the conditions are satisfied and the answer is YES, the measurement of the number of first detection signal periods and the number of second detection signal periods and the measurement of the engine load and exhaust temperature as operation state values of the internal combustion engine 502 are started (step 703). The measurement of the first detection signal surrounding area and the second detection signal surrounding area is started (step 704). The predetermined arithmetic operating time TCAL is counted (step 705). A check is made to see if the above various kinds of measurements have been completed without departing from the catalyst deterioration judgment performing conditions in the arithmetic operating time TCAL or not (step 706).

Figure 44:
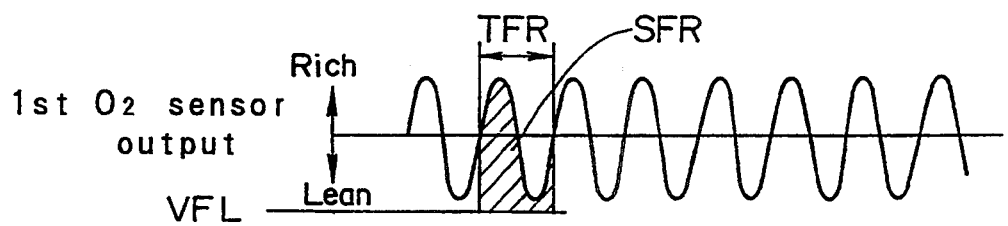
Figure 45:
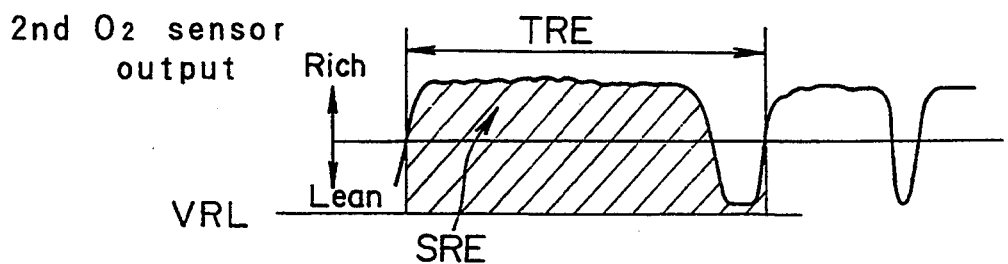
Figure 46:
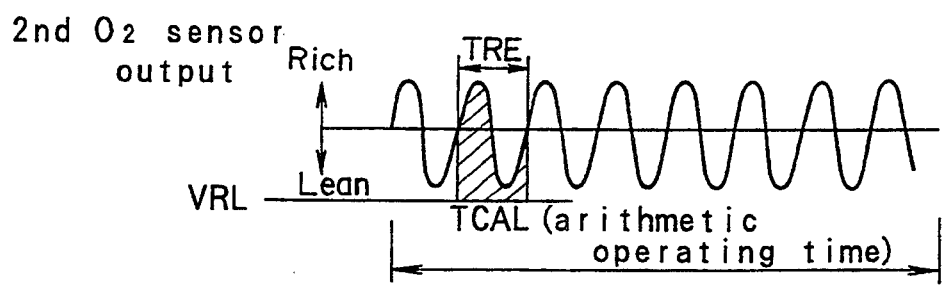

As shown in FIGS. 44 to 46, as for the number of first detection signal periods and the number of second detection signal periods, t numbers of periods of time TFR and TRE during which the first detection signal which is generated from the first O₂ sensor 586 and the second detection signal which is generated from the second O₂ sensor 588 are inverted between rich and lean states are measured in the predetermined arithmetic operating time TCAL and summed. As shown in FIGS. 44 to 46, as for the first detection signal surrounding area and the second detection signal surrounding area, the areas SFR and SRE which are surrounded by the loci of the periods of time TFR and TRE during which the first and second detection signals are inverted and lower limit voltages VFL and VRL are measured in the predetermined arithmetic operating time TCAL and summed. The engine load and exhaust temperature as operation state values mentioned above are measured in the predetermined operating time TCAL and summed.

In the above judgment (step 706), in the case where the above various kinds of measurements have been completed while departing from the catalyst deterioration judgment performing conditions in the arithmetic operating time TCAL and the answer is NO, the processing routine is returned to the reading of the catalyst deterioration judgment performing conditions (step 701). In the above (step 706), in the case where the various kinds of measurements have been completed without departing from the catalyst deterioration judgment performing conditions in the arithmetic operating time TCAL and the answer is YES, the period ratio SHUKI is calculated from the number of first detection signal periods and the number of second detection signal periods, the area ratio SR is calculated from the first detection signal surrounding area and the second detection signal surrounding area, the deterioration judgment arithmetic operation value REK is calculated from the period ratio SHUKI and the area ratio SR, the average value is calculated from the engine load and exhaust temperature as operation state values in the arithmetic operating time TCAL, and the correction value $\alpha$ is obtained (step 707).

The period ratio SHUKI is calculated by: the period ratio SHUKI = (the number of periods TFR in the arithmetic operating time TCAL)/(the number of periods TRE in the arithmetic operating time TCAL). In the case where the period TRE of the second detection signal is never inverted in the arithmetic operating time TCAL, TRE=1 is set. It is now assumed that the period SHUKI satisfies the following relation: the catalyst material used (low purification) < period ratio SHUKI < new catalyst material (high purification).

Figure 47:
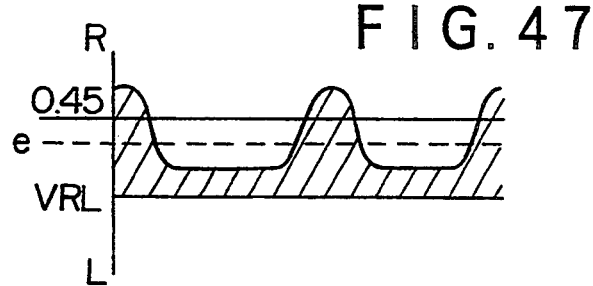
Figure 48:
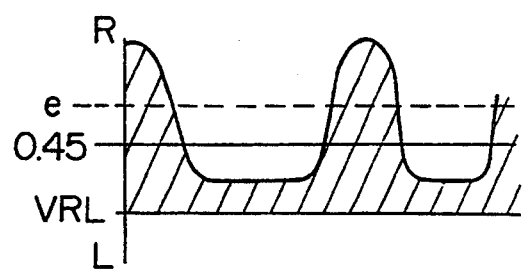

The area ratio SR is calculated by: the area ratio SR = (the sum of the area SRE in the arithmetic operating time TCAL)/(the sum of the area SFR in the arithmetic operating time TCAL). As shown in FIGS. 47 and 48, the area ratio SR is set such that SR=SRE/SFR when a rich-lean judgment voltage e of the second O₂ sensor 588 > 0.45 V. SRE increases when a purification factor is high. That is, the following relation is satisfied: when the purification factor is low < SR < when the purification factor is high.

Figure 52:
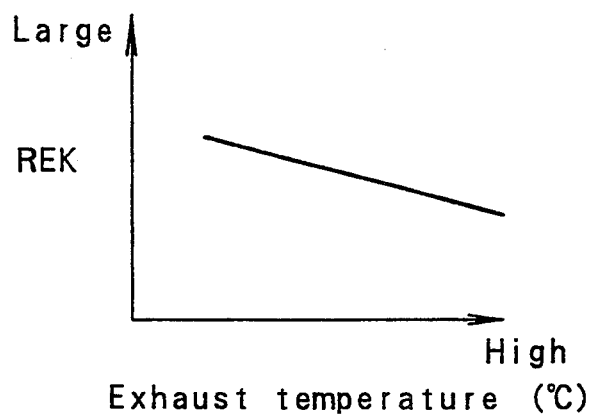
Figure 53:
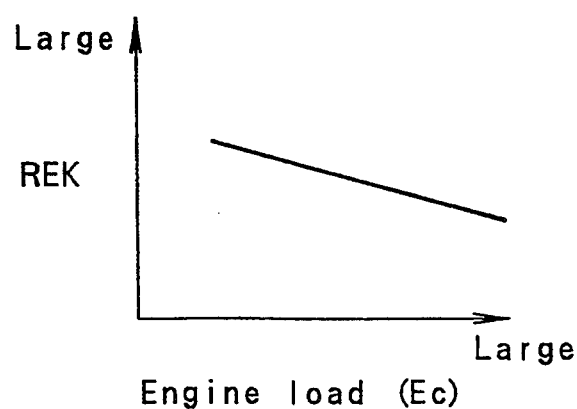

The deterioration judgment arithmetic operation value REK obtained by the calculation is step 707 is corrected by the correction value $\alpha$ (step 708). Namely, as shown in FIGS. 52 and 53, from REK=SR×SHUKI×$\alpha$; (REK$\geq$1), the deterioration judgment arithmetic operation value REK which is calculated from the period ratio SHUKI and the area ratio SR is corrected by the engine load $E_c$ and exhaust temperature as a correction value $\alpha$ thereby obtaining the deterioration judgment arithmetic operation value REK after correction.

The calculation to obtain the corrected deterioration judgment arithmetic operation value REK in the arithmetic operating time TCAL as mentioned above is executed n times (step 709). A check is made to see if the calculation to obtain the corrected deterioration judgment arithmetic operation value REK in the arithmetic operating time TCAL has been repeated n times or not (step 710). If NO in the judgment (step 710), the processing routine is returned to the reading of the catalyst deterioration judgment performing conditions (step 701).

Figure 50:
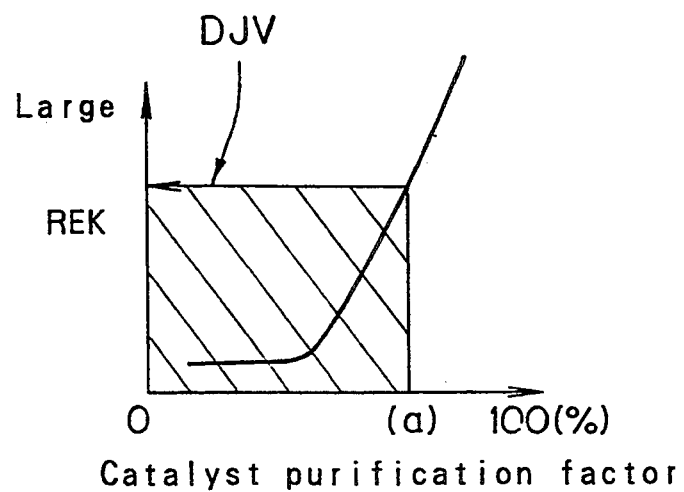

If YES in the judgment (step 710), as shown in FIG. 50, an arithmetic mean REKAV of the corrected deterioration judgment arithmetic operation values REK obtained by the arithmetic operations of n times is calculated (step 711). The arithmetic mean REKAV is compared with a deterioration judgment value which has been preset in the judging section 608 (step 712), thereby discriminating whether the catalyst has deteriorated or not (step 713).

In the judgment (step 713), in the case where the catalyst material 528 has deteriorated and the answer is YES, warning means (not shown) such as an alarm lamp or the like is made operative and an alarm is generated (step 714). After the internal combustion engine 502 was started, when the judgment of the catalyst material 528 in steps 701 to 714 is once executed, the judgment of the deterioration is not executed (step 715) until the internal combustion engine 502 is subsequently stopped. The processing routine is finished (step 716). In the judgment (step 713), even when the catalyst material 528 is not deteriorated and the answer is NO, the judgment of the deterioration is not performed as well (step 715) until the internal combustion engine 502 is subsequently stopped. The processing routine is finished (step 716).

As mentioned above, in the case where the predetermined deterioration judgment performing conditions are satisfied, the judging section 608 provided in the control section 568 obtains the deterioration judgment arithmetic operation value REK in which the period ratio SHUKI and the area ratio SR of the first and second detection signals in the arithmetic operating time TCAL have been corrected by the correction value α and judges the deterioration state of the catalyst material 528 by the arithmetic mean REKAV of the deterioration judgment arithmetic operation values REK of n times.

Figure 49:
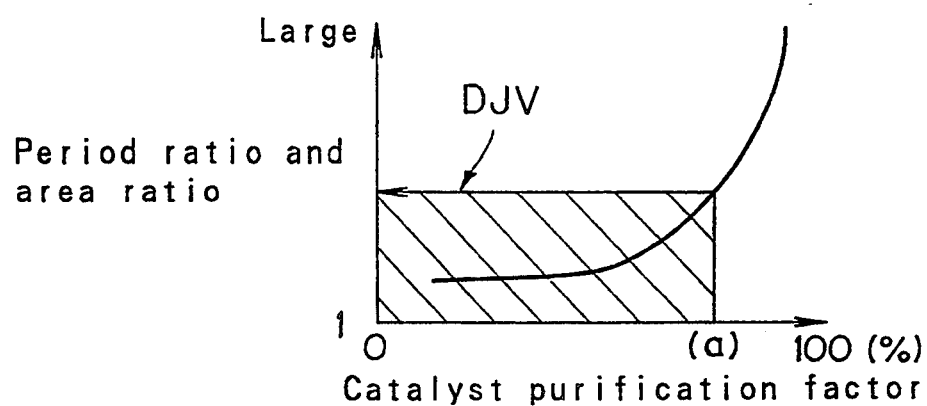

Due to this, as compared with the judgment by only the period ratio SHUKI and the area ratio SR shown in FIG. 49, as shown in FIG. 50, not only the period ratio SHUKI of the first and second detection signals but also the area ratio SR are calculated and multiplied and the arithmetic mean REKAV of n times of the deterioration judgment arithmetic operation values REK which have been corrected by the correction value α is obtained and the judgment is performed. Therefore, the deterioration state of the catalyst material 528 can be correctly measured and the judging precision of the deterioration state can be improved.

Therefore, proper maintenance information regarding the catalyst material 528 can be obtained and the needless exchange of the catalyst material 528 due to the improper information can be avoided. The needless confusion by the improper information can be avoided. The reliability can be improved.

According to the present invention as mentioned above, not only the period ratio of the first detection signal of the first exhaust sensor and the second detection signal of the second exhaust sensor but also the area ratio are calculated and multiplied and the deterioration judgment arithmetic operation value corrected by the correction value is obtained, thereby judging. Therefore, the deterioration state of the catalyst can be correctly measured and the judging precision of the deterioration state can be improved.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a catalyst deterioration judging apparatus of an internal combustion engine in which a first exhaust sensor is provided on an exhaust passage of the internal combustion engine on an upstream side of a catalyst material provided in the exhaust passage, a second exhaust sensor is provided on said exhaust passage on the catalyst downstream side, and a deterioration of the catalyst material is judged while feedback controlling an air fuel ratio by detection signals of the first and second exhaust sensors, the improvement comprising control means having a judging function such that upon judgment of a deterioration, a feedback correction amount is set to be larger than that in a non-deteriorated state, a dual exhaust sensor feedback control is stopped, a rich judgment delay time and a lean judgment delay time are set in accordance with a ratio at the time of the dual exhaust sensor feedback control so as to set a rich-/lean judgment delay time to a predetermined time, said feedback correction amount is set to a deterioration judgment value, a second exhaust sensor response delay time is corrected by an engine load and an exhaust temperature, and said deterioration judgment value is corrected by a period of time of a first exhaust sensor, the second exhaust sensor response delay time after completion of the correction is compared with said deterioration judgment value, and the deterioration of the catalyst material is judged.

2. A catalyst deterioration judging apparatus of an internal combustion engine in which a first exhaust sensor is provided on an exhaust passage of the internal combustion engine on an upstream side of a catalyst material provided in said exhaust passage, a second exhaust sensor is provided on said exhaust passage on the catalyst downstream side, and a deterioration of the catalyst material is judged while feedback controlling an air fuel ratio by detection signals of the first and second exhaust sensors, the improvement comprising control means having a function such that a rich judgment delay time and a lean judgment delay time are set in accordance with a ratio at the time of a dual exhaust sensor feedback control, and when a rich/lean judgment delay time is set to a predetermined time, variation characteristics of an output performance of the first exhaust sensor are measured by the first exhaust sensor period of time, and the deterioration judgment value is corrected by said variation characteristics.

3. An apparatus for judging a deterioration of a catalyst of an internal combustion engine in which a first exhaust sensor is provided on an exhaust passage of the internal combustion engine on an upstream side of a catalyst material provided in said exhaust passage, a second exhaust sensor is provided on the exhaust passage on a downstream side of the catalyst material, a first feedback control is performed to set an air-fuel ratio to a target value on the basis of a first feedback control value which is calculated from a first detection signal that is generated from said first exhaust sensor, and a second feedback control is executed to correct said first feedback control value by judging a deterioration state of the catalyst material on the basis of a second feedback control value which is calculated from a second detection signal that is generated from said second exhaust sensor, the improvement comprising control means for controlling in a manner such that when catalyst deterioration judging conditions are satisfied, the second feedback control value upon judgment of the deterioration is set in correspondence to the second feedback control value in the case where said catalyst deterioration judging conditions are not satisfied, the sum of a rich inversion delay time and a lean inversion delay time is set to a predetermined value, a ratio of the rich inversion delay time and a ratio of the lean inversion delay time are set to be equal, a correction amount of the first feedback control value is set to be larger than a correction amount in the case where the catalyst deterioration judging conditions are not satisfied, and an integration judging time of the second feedback control value in the case where the catalyst deterioration judging conditions are satisfied is set to be shorter than an integration judging time in the case where the catalyst deterioration judging conditions are not satisfied.

4. An apparatus for judging a deterioration of a catalyst material of an internal combustion engine comprising: first and second exhaust sensors which are respectively provided on an exhaust passage of the internal combustion engine on the upstream side and downstream side of the catalyst material provided on said exhaust passage; and control means for performing a first feedback control to set an air fuel ratio to a target value on the basis of a first detection signal which is generated from said first exhaust sensor and for performing a second feedback control to correct said first feedback control by a second detection signal which is generated from said second exhaust sensor, comprising the improvement in that said control means has a judging section such that in the case where predetermined deterioration judgment performing conditions are satisfied, the number of first detection signal periods and the number of second detection signal periods in a predetermined arithmetic operating time are measured from periods of time during which said first and second detection signals are inverted, thereby calculating a period ratio, a first detection signal surrounding area and a second detection signal surrounding area in said predetermined arithmetic operating time are measured from areas which are surrounded by loci of the periods of time during which said first and second detection signals are inverted, thereby calculating an area ratio, an operation state value in said predetermined arithmetic operating time is measured from an operating state of said internal combustion engine, thereby calculating a correction value, deterioration judgment arithmetic operation values in which said period ratio and said area ratio have been corrected by said correction value are obtained, and an arithmetic operation is performed to judge a deterioration state of said catalyst material by said deterioration judgment arithmetic operation values.

\* \* \* \* \*